United States Patent
Mathews et al.

(10) Patent No.: US 9,608,717 B1
(45) Date of Patent: Mar. 28, 2017

(54) METHOD AND SYSTEM FOR COMMUNICATING BETWEEN A MEDIA PROCESSOR AND NETWORK PROCESSOR IN A GATEWAY DEVICE

(71) Applicant: The DIRECTV Group, Inc., El Segundo, CA (US)

(72) Inventors: Robin M. Mathews, Westford, MA (US); Henry Derovanessian, Manhattan Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 14/871,711

(22) Filed: Sep. 30, 2015

(51) Int. Cl.
| | |
|---|---|
| H04N 7/18 | (2006.01) |
| H04B 7/185 | (2006.01) |
| H04N 21/61 | (2011.01) |
| H04N 21/262 | (2011.01) |
| H04N 21/436 | (2011.01) |

(52) U.S. Cl.
CPC ... *H04B 7/18526* (2013.01); *H04N 21/26216* (2013.01); *H04N 21/43615* (2013.01); *H04N 21/6143* (2013.01)

(58) Field of Classification Search
None
See application file for complete search history.

(56) References Cited

U.S. PATENT DOCUMENTS

| | | | | |
|---|---|---|---|---|
| 6,349,352 B1* | 2/2002 | Lea | ...... | H04L 12/2803 375/E7.001 |
| 2002/0019984 A1* | 2/2002 | Rakib | ...... | G08B 13/19656 725/111 |
| 2002/0061012 A1* | 5/2002 | Thi | ...... | H04B 3/23 370/352 |
| 2002/0078161 A1* | 6/2002 | Cheng | ...... | H04L 12/2803 709/208 |
| 2002/0184373 A1* | 12/2002 | Maes | ...... | G10L 15/30 709/228 |
| 2003/0028585 A1* | 2/2003 | Yeager | ...... | G06F 9/4416 709/201 |
| 2003/0097497 A1* | 5/2003 | Esakov | ...... | H04N 21/43615 710/16 |
| 2004/0010687 A1* | 1/2004 | Futa | ...... | H04N 5/76 713/168 |

(Continued)

*Primary Examiner* — Fernando Alcon
(74) *Attorney, Agent, or Firm* — Harness, Dickey & Pierce, PLC

(57) ABSTRACT

A gateway device includes a media processor module comprising a gateway application module. The gateway device also includes a router module comprising a gateway abstraction module and an interface handler module. The gateway device also includes a shared interface module in communication with the router module and the media processor module. The shared interface module receives a service request signal from the gateway application module. The gateway abstraction module obtains the service request signal from the shared interface module through an interface handler module. The gateway abstraction module communicates a response signal to the media processor module through the shared interface module. The media processor module performs a function in response to the response signal.

23 Claims, 35 Drawing Sheets

(56) References Cited

U.S. PATENT DOCUMENTS

| | | | |
|---|---|---|---|
| 2005/0234735 A1* | 10/2005 | Williams | G06F 21/10 |
| | | | 726/29 |
| 2007/0204300 A1* | 8/2007 | Markley | H04N 7/17318 |
| | | | 725/46 |
| 2008/0112405 A1* | 5/2008 | Cholas | H04L 63/062 |
| | | | 370/389 |
| 2008/0162495 A1* | 7/2008 | Chu | H04N 7/17318 |
| 2008/0285945 A1* | 11/2008 | Rajakarunanayake | H04N 21/4325 |
| | | | 386/235 |
| 2011/0202956 A1* | 8/2011 | Connelly | H04N 21/433 |
| | | | 725/38 |
| 2011/0307932 A1* | 12/2011 | Fan | H04N 21/2547 |
| | | | 725/110 |
| 2012/0275450 A1* | 11/2012 | Connelly | H04L 65/104 |
| | | | 370/352 |
| 2013/0086616 A1* | 4/2013 | Kim | H04L 65/1083 |
| | | | 725/62 |
| 2014/0331135 A1* | 11/2014 | Sukoff | H04L 65/60 |
| | | | 715/719 |
| 2016/0105712 A1* | 4/2016 | Venes | H04N 21/4363 |
| | | | 725/81 |

* cited by examiner

US 9,608,717 B1

METHOD AND SYSTEM FOR COMMUNICATING BETWEEN A MEDIA PROCESSOR AND NETWORK PROCESSOR IN A GATEWAY DEVICE

TECHNICAL FIELD

The present disclosure relates generally to a system gateway and, more specifically, to a method and system for communicating between a network processor and a media processor of the gateway.

BACKGROUND

The statements in this section merely provide background information related to the present disclosure and may not constitute prior art.

The typical home includes access to a wide area network through a modem and router. A typical home also includes access to television programming through satellite or cable systems. Satellite television providers continually provide increasing amounts of content. Some content is available through the satellite, while other types of content are provided through a wide area network under control of the satellite provider. The wide area network includes the internet. Content based providers also provide content to consumers directly through the wide area network. The content from the internet based provider is handled through the modem and router. The satellite system typically includes a plurality of set top boxes for receiving content. The set top boxes are a separate system from the internet-based content providers. Consumers must provide the means for obtaining access through the satellite or cable system as well as the router and modem. This increases the cost of obtaining content for a consumer. The only interaction with such system is when a set top box communicates through the local area network and through the wide area network to obtain or communicate information therethrough. Operationally, however, these systems are entirely separate. Consequently, the consumer has a potential to have multiple points of failure for the entire content set up.

Because the television system and wide area network or internet system are separate, performance through the local area network to the wide area network is not controlled. The degradation of service may be evident in such instances. The amount of devices that access video content and other wide area network or internet content is increasing. Providing reliable access to all types of content, regardless of the source, is a desirable goal for content providers.

SUMMARY

The present disclosure provides a gateway device that improves the overall household performance by efficiently communicating between the media processor and the network processor of a gateway device.

In one aspect of the disclosure, a method of operating a gateway device having a router module, a media processor module and a shared interface module intercommunicating with the router module and the media processor includes receiving a service request signal at the shared interface module from a gateway application module of the media processor module, obtaining, at the router module, the service request signal from the shared interface module through an interface handler module of the router module, communicating the service request signal to a gateway abstraction module of the router module, communicating a response signal from the gateway abstraction module to the media processor module through the shared interface module and performing a function at the media processor in response to the response signal.

In a further aspect of the disclosure, a gateway device includes a media processor module comprising a gateway application module. The gateway device also includes a router module comprising a gateway abstraction module and an interface handler module. The gateway device also includes a shared interface module in communication with the router module and the media processor module. The shared interface module receives a service request signal from the gateway application module. The gateway abstraction module obtains the service request signal from the shared interface module through an interface handler module. The gateway abstraction module communicates a response signal to the media processor module through the shared interface module. The media processor module performs a function in response to the response signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
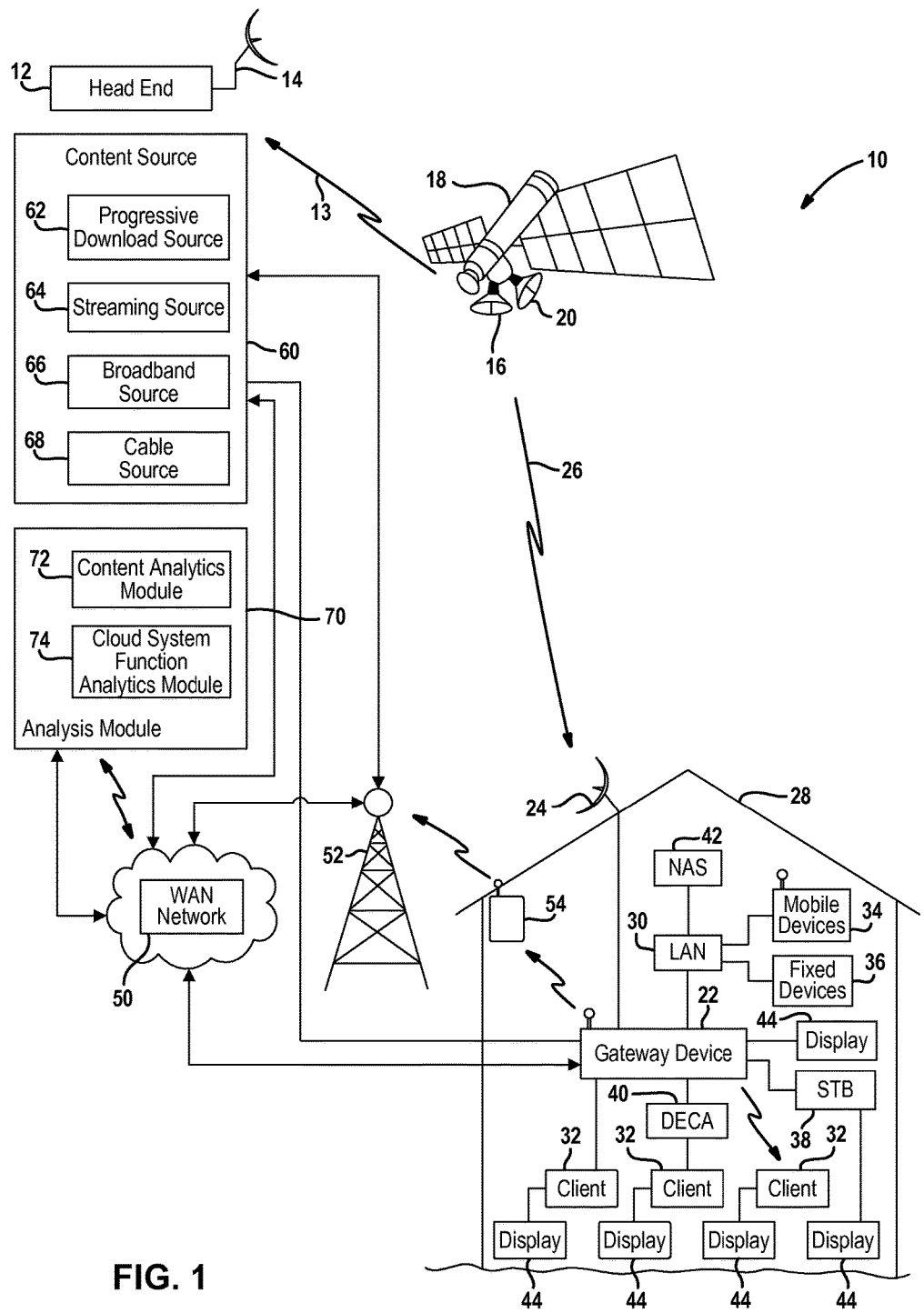
FIG. 1 is a high level block diagrammatic view of a satellite communication system including a gateway device.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a general purpose computing device, a processor (shared, dedicated, or group) and memory that execute one or more software or firmware programs, a combinational logic circuit, and/or other suitable components that provide the described functionality. As used herein, the phrase "at least one of A, B, and C" should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in electrical circuitry, analog circuitry, digital circuitry, system on chips or combinations thereof. Further, the computing device may include a microprocessor (processor) or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term "title" will be used to refer to, for example, a movie itself and not the name of the movie. As used herein, the term "content" will be used to refer to, for example, a movie or program itself "Content identifier" refers to the data associated with content used for identifying the content. Machines may use an actual numeric or alphanumeric value unique to the content. People may use a title for identification. Various types of data may be associated with the content. For program guides and recommendations list content identifiers, a cluster identifier and other data may also be provided with the content.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

In the following examples, recommendations of titles of various programs are provided. The content recommendations may provide a title either graphically or alpha-numerically or a combination of both. Graphically, content posters or thumbnails may be provided. Several lists are generated, sorted and processed herein. The lists may include content or program titles or one or more alphanumeric identifiers or both. The list may not contain the actual content itself.

Referring now to FIG. 1, a satellite television broadcasting system 10 is illustrated. The satellite television broadcast system 10 includes a head end 12 that generates wireless signals 13 through an antenna 14 which are received by an antenna 16 of a satellite 18. The wireless signals 13, for example, may be digital. The wireless signals 13 may be referred to as an uplink signal. A transmitting antenna 20 generates downlink signals 26 that are directed to various receiving systems including stationary systems such as those in the home, as well as mobile receiving systems. One example of a receiving unit is a set top box. Another device is a gateway device 22. The gateway device 22 is in communication with a respective antenna 24. Each antenna 24 receives downlink signals 26 from the transmitting antenna 20 of the satellite 18. The gateway devices and set top boxes may be referred to as satellite television receiving devices.

The gateway device 22 may be connected within a building 28 such as a house, multi-dwelling unit or commercial building. A local area network 30 may be used to connect gateway device 22 with client devices 32 and other IP devices such as mobile devices 34 and fixed devices 36. The local area network 30 may be a wireless network or a wired network. The interconnection of the gateway device 22 with the client devices 32 allow for multi-room viewing of content as well as coordinated content recording. The gateway device 22 may also be referred to as a server device. The gateway device 22 may be used to distribute content, channels, programs and other data to each of the client devices 32.

Examples of a mobile device 34 include but are not limited to mobile phones, tablet devices and portable computers. Fixed devices 36 may include desktop computers, video game systems, printers or other IP devices that are not meant to be transported on a regular basis.

The gateway device 22 may also be in communication with a set top box 38. The set top box 38 and the gateway device 22 may also be connected through the local area network 30. Coordination of recordings may also be provided between the set top box 38 and the gateway device 22. The set top box 38 may also include a DVR that communicates content to the gateway device 22. The gateway device 22 may also communicate content to the set top box 38. The client device 32 may be connected to the gateway device 22 through a DIRECTV® Ethernet to coaxial module DECA module 40. The DECA module 40 converts Ethernet content to content suitable for communication through a coaxial network. One or more of the client devices 32 may have a DECA module 40 associated therewith.

The local area network 30 may also have network area storage 42 associated therewith. The network area storage (NAS) 42 may be used for storing content and other data files from the mobile devices 34, the fixed devices 36 or from the gateway device 22. The network area storage 42 may be accessible from one or more of the devices in communication with the local area network 30.

The gateway device 22 may also be in communication with the head end 12 through a wide area network 50. The wide area network 50 may be one type of network or multiple types of networks. The network 36 may, for example, be a public switched telephone network, the internet, a mobile telephone network or other type of network.

The gateway device 22, the client devices 32 and the set top box 38 may all be in communication with a display 44 used for displaying content. Although a separate display is not illustrated for the mobile devices 34 and the fixed devices 36, it is understood that displays may be incorporated into those devices as well. The displays 44 may be a monitor or television, or other screen device used for displaying content, program guides, descriptions, graphical user interfaces and the like. The graphical user interfaces may be selected using the input 125. The input 125 may be a remote control or other pointing device used to make a selection of choices set forth within a graphical user interface.

A cellular phone tower 52 is also illustrated. A cellular phone tower 52 may provide access to a mobile telephone network and to the wide area network 50. In the case where a gateway device 22 does not have access to the wide area network through a service such as a digital subscriber line or cable modem, a mobile device 54 may be incorporated into the system. The mobile device 54 may receive signals from the gateway device 22 that are intended for the wide area network 50 and communicate the signals through the cellular tower 52 to the wide area network. The mobile device 54 may allow the head end 12 to communicate with the gateway device 22 directly. Examples of suitable uses for the gateway device 22 to connect with the head end 12 may be for call back signals that are generated when ordering on-demand or pay-per-view content. The gateway device 22 may also be in communication with the wireless area network through the cellular tower 52 to provide various types of internet content, analytics and the like to and from the gateway device 22.

The head end 12 may be in communication with an external content source 60. The external content source 60 may contain a progressive download source 62, a streaming source 64 and a broadband source. The content source 60 may provide content for distribution through the satellite 18 to the gateway device 22. The external content source 60 may also provide content to the gateway device 22 through the progressive download source 62 and the streaming source 64 through the wide area network 50. The broadband source 66 communicates broadband content to the gateway device 22. A cable television source 68 may also be coupled to the gateway device 22 directly through a cable or through the wide area network 50. The cable television source 68 provides cable content to the head end 12 or to the gateway device 22 through a wired or wireless connection.

The system 10 may also include an analytics module 70 that includes a content analytics module 72 and a cloud system function analytics module 74. The content analytics module 72 may be used to analyze the content browsed by devices connected to the gateway device 22. The content analytics module 72 may use intelligence to derive customer behavior and improve targeting of customer needs in relation to content browsed through the gateway device 22. For example, the content analytics module 72 may monitor third party video websites and keep track of content watched or browsed so that improved recommendations may be provided to customers when browsing through a user interface at the gateway device 22. The content analytics provided by the content analytics module 72 may also be used to adjust the advertisements provided to the gateway device 22. A content analytics module 72 may also provide data so that content relevant to the user is prepositioned at the gateway device 22. Details of the operation of the content analytics module 72 are provided below.

The cloud system function analytics module 74 provides an external analytical engine for analyzing data provided from the gateway device 22. Data may be communicated to the cloud system function analytics module 74 directly or indirectly from a monitoring module that may be internal or external to the gateway device 22. The cloud system function analytics module 74 may act as a real-time monitoring module that extracts low level information and stores it in a database. The cloud system function analytics module 74 may provide real-time visualization of various parameters of operation of the gateway device 22. The operation of the cloud system function analytics module 74 will be described in further detail below.

Figure 2:
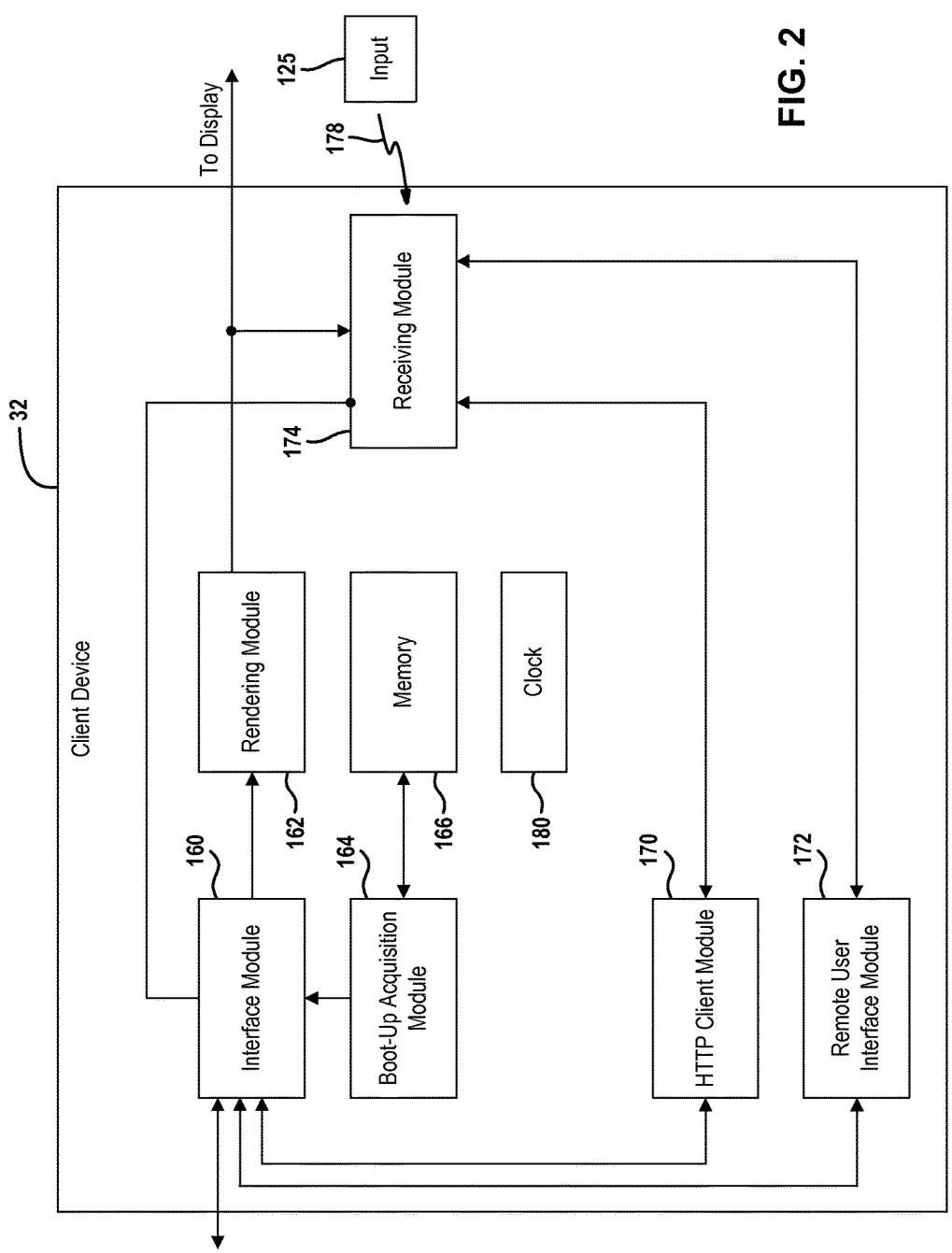
FIG. 2 is a block diagrammatic view of a client device that is in communication with the gateway device.

Referring now to FIG. 2, the client device 32 is illustrated in further detail. The client device 32 may include various component modules for use within the local area network 30 and for displaying content signals. The display of content signals may take place by rendering signals provided from the network. It should be noted that the client device 32 may comprise various different types of devices or may be incorporated into various types of devices. For example, the client device 32 may be a standalone device that is used to intercommunicate through a local area network to the gateway device 22 illustrated in FIG. 1. Communication to the gateway device 22 may be wired or wireless. The client device 32 may also be incorporated into various types of devices such as a television, a video gaming system, a hand-held device such as a phone or personal media player, a computer, or any other type of device capable of being networked.

The client device 32 may include various component modules such as those illustrated below. It should be noted that some of the components may be optional components depending on the desired capabilities of the client device and the overall system. The client device 32 includes an interface module 160. The interface module 160 may control communication between the local area network and the client device 32. Digital Transmission Content Protocol Volume 1 (DTCP) may be used to encrypt the communication signals between the gateway and client device as a form of digital rights management. As mentioned above, the client device 32 may be integrated within various types of devices or may be a standalone device. The interface module 160 communicates with a rendering module 162. The rendering module 162 receives formatted signals through the local area network that are to be displayed on the display. The rendering module 162 merely places pixels in locations as instructed by the formatted signals. Rendering may also take place using vector graphics commands that instruct a group of pixels to be formed by the client based on simple instructions. By not including a decoder, the rendering module 162 will allow consistent customer experiences at various client devices. The rendering module 162 communicates rendered signals to the display of the device or an external display. The rendered signals may include but are not limited to a program guide and guide banners or row ads associated therewith, a playlist, a pay-per-view list, and a recommendations list. A recommendation list may contain recommended programs or movies or both. Recommended lists may also include content or movies that are stored within the gateway device 22.

A boot-up acquisition module 164 may provide signals through the interface module 160 during boot-up of the client device 32. The boot-up acquisition module 164 may provide various data that is stored in memory 166 through the interface module 160. The boot-up acquisition module 164 may provide a make identifier, a model identifier, a hardware revision identifier, a major software revision, and a minor software revision identifier. Also, a download location for the server device to download a boot image may also be provided. A unique client device identifier for each client device may also be provided. The gateway device 22 may receive the client device identifier in communication signals from each client device. The client device identifier may be used in various communications between the client device and the gateway device 22. For example, when requesting a playlist, a pay-per-view list, a set top box guide, a movie list or recommendations, a listing request may come with a client device identifier so that the particular client device may be identified by the gateway device 22. Also, when viewing requests, such as channel tuning, content selection and the like are performed, the client device identifier may be communicated from the client device. The gateway device 22 may correlate the watched content and the client device so that recommendations, ordered playlists, pay-per-view list, guide banners and movie recommendations may be personalized for the various client devices. The boot-up acquisition module 164 may obtain each of the above-mentioned data from memory 166.

Communications may take place using HTTP client module 170. The HTTP client module 170 may provide formatted HTTP signals to and from the interface module 160.

A remote user interface module 172 allows client devices associated with the client device 32 to communicate remote control commands and status to the server device. The remote user interface module 172 may be in communication with the receiving module 174. The receiving module 174 may receive the signals from a remote control or input 125 through input signal 178 associated with the display and convert them to a form usable by the remote user interface module 172. The remote user interface module 172 allows the server device to send graphics and audio and video to provide a full featured user interface within the client. Screen displays may be generated based on the signals from the server device. Thus, the remote user interface module 172 may also receive data through the interface module 160. It should be noted that modules such as the rendering module 162 and the remote user interface module 172 may communicate and render both audio and visual signals. The receiving module 174 may receive input signals from the input 125. The input 125 may be a visual input signal that may include, but is not limited to, a graphical input signal such as a stylus signal or a gesture signal, a mouse signal, or a pointer signal.

The data received through the receiving module 174 may be communicated directly to the interface module 160 and ultimately the server device with very little processing because very little processing power may be included within a client device 32. The receiving module 174 may convert the signals input into electrical signals for transmission or communication to the server device. For example, the raw voice signals may be communicated to the server device through the interface module 160.

A clock 180 may communicate with various devices within the system so that the signals and the communications between the server device and client are synchronized and controlled.

Figure 3:
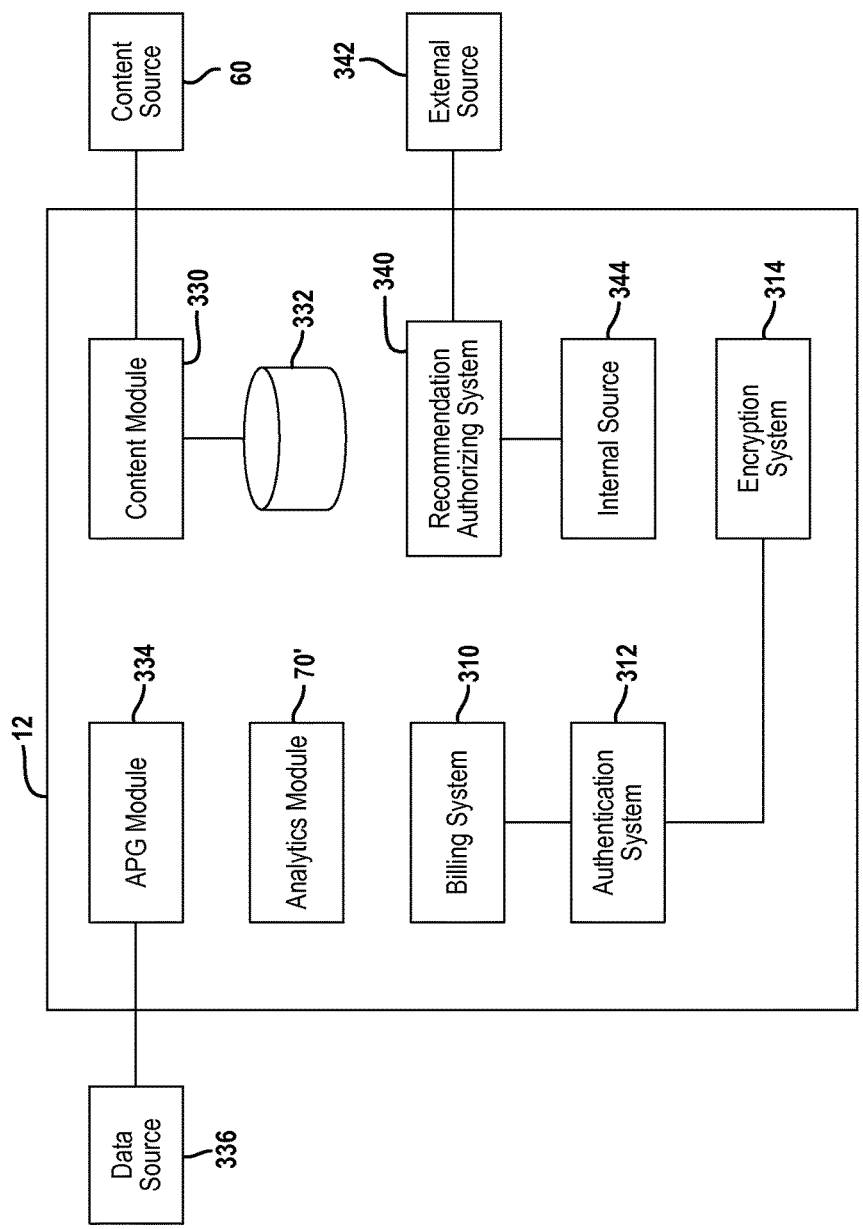
FIG. 3 is a block diagrammatic view of a head end.

Referring now to FIG. 3, the head end 12 is illustrated in further detail. The head end 12 may include a billing system 310. The billing system 310 may include various types of account information including the billing address, the subscriptions that the user subscribes to, authorizations, conditional access identifiers and the like. The billing system 310 is in communication with an authentication system 312. The authentication system 312 may authenticate devices that are in communication with the head end 12, including the gateway device 22 and the various user devices in communication with the head end through the wide area network. The authentication system 312 may also be in communication with an encryption system 314 used to encrypt content. Various encryption keys may be used to encrypt content for particular users. By encrypting content in the encryption system 314, content is prevented from use by unauthorized users. Encryption may take place for individual content or may take place for broadcasted content used by a plurality of users. Authentication may take place in the authentication system 312 by using a password or through a conditional access system located in the individual devices. The conditional access system may have logic designed to decrypt the content.

The head end 12 may communicate content to the gateway device 22 of FIG. 1 using a content module 330. The content module 330 may process the content into appropriate formats for broadcasting or point-to-point delivery. Transcoding, frequency translation, multiplexing and amplification may all be performed within the content module 330. The type of processing is at least in part based on the mechanism of delivery. Different versions of content may be housed in a content repository 332. The content source 60 may provide content to the content module 330. Content may be provided in a tape or recordable disk as well as through cable, RF or satellite.

An advanced program guide (APG) module 334 communicates program guide data to various users of the system. For example, the APG module 334 may communicate guide date to the gateway device 22 of FIG. 1 through the satellite 18. The content source 60 may provide guide data to the APG module 334. However, a separate data source 336 may also provide the advance program guide module 334 with data. The data corresponding to content may include titles, posters, actor data, descriptions, parental ratings, user ratings, studio data, credits data, genre data, subgenre data, content type and the like.

The head end 12 may also include a recommendation authoring system 340. The recommendation authoring system 340 generates an external recommendation list that is ultimately communicated to the gateway device 22. The external recommendation list may include recommended content titles, related content to the recommended content and the strength of similarity score between the related content and recommended content. In this case both the recommended content and the related content refer to content titles for the specific programming. The external recommendation list may include other types of metadata such as the channel, actors, ratings, the start and end times, the date and information as to whether the content will be broadcasted at a different time. In the present example, the external recommendation list may be the same for different gateway devices 22. As will be described below the external recommendation list may be communicated to and modified by the gateway devices 22.

The recommendation authoring system 340 may be a combination of automated and operator controlled systems. The recommendation authoring system 340 may receive data from various sources including external sources 342 and internal sources 344 available from within the head end 12. The external sources may, for example, be provided from one or more experts, from Nielsen® ratings, Blue Fin®, or other external sources. An example of an internal source 344 is "What's Hot", which is a list of the most watched and talked about programming available from the system provider associated with the head end 12. The internal source 344 may also be modified according to various marketing experts within the head end 12. The compilation of the external sources and internal sources may be performed to obtain the external recommendation list. Both the external sources 342 and internal sources 344 may also generate the related content list. The related content list may also have the same type of metadata associated with the recommended content.

An analytics module 70' may also be incorporated into the head end 12. The analytics module 70' may perform the same functions as the analytics module 70 illustrated in FIG. 1. In FIG. 1, the analytics module 70 is a separate web connected module. However, the analytics module 70' may be incorporated into the head end 12. The analytics module 70' may incorporate the functions of the content analytics module 72 and the cloud system function and the analytics module 74 described above. They have not been illustrated as a separate device for simplicity in FIG. 3.

Figure 4:
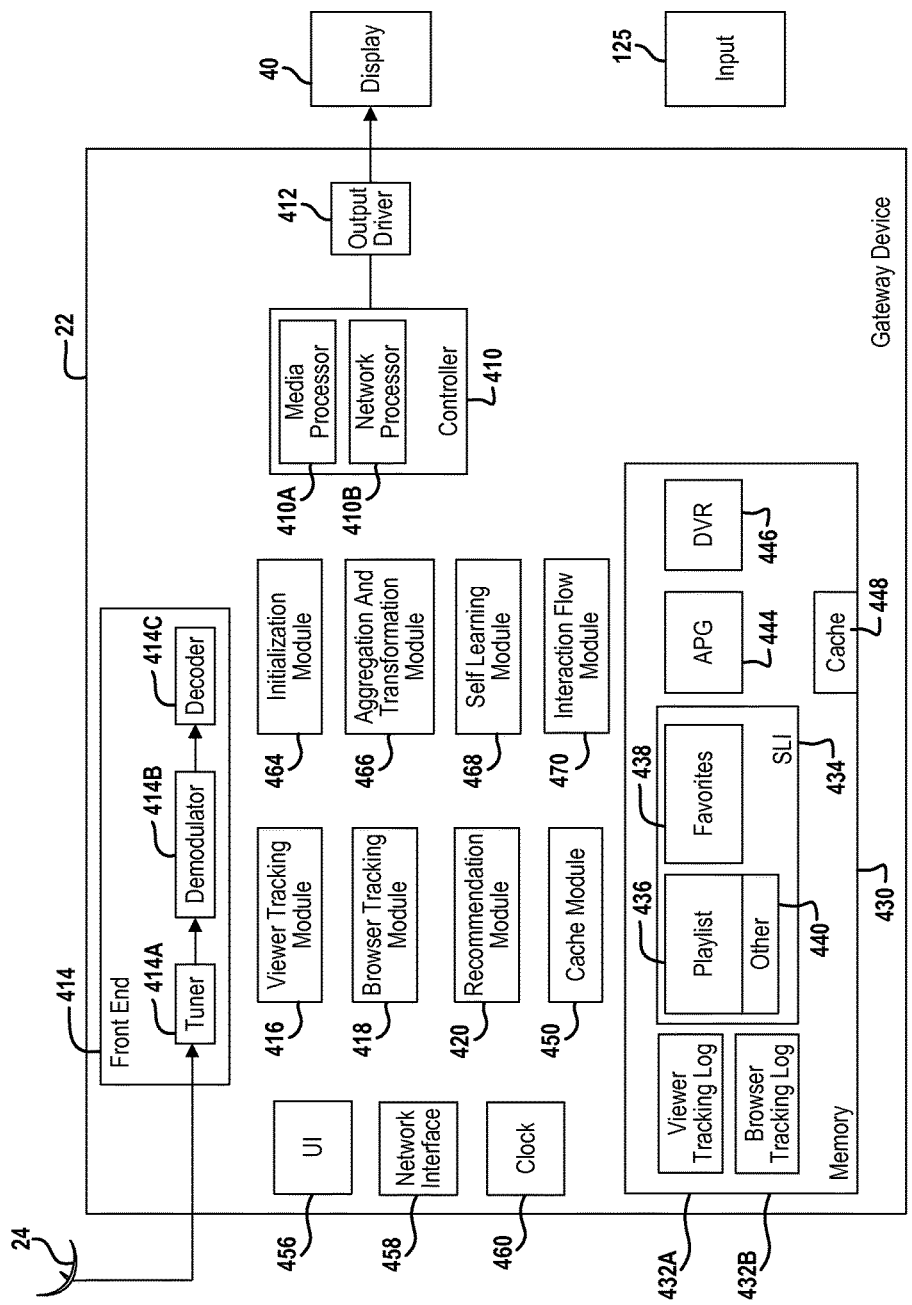
FIG. 4 is a block diagrammatic view of a gateway device according to the present disclosure.

Referring now to FIG. 4, a gateway device 22 is illustrated in further detail. Although, a particular configuration of the gateway device 22 is illustrated, it is merely representative of various electronic devices with an internal controller used as a content receiving device. The antenna 24 may be one of a number of different types of antennas that includes one or more low noise blocks. The antenna 24 may be a single antenna 24 used for satellite television reception. The gateway device 22 may be coupled to the display 44. The display 44 may have an output driver 412 within the gateway device 22.

The gateway device 22 may be headless so that it may be placed in any location throughout the home. That is, no direct connection to a display or television is required.

A controller 410 is used to coordinate and control the various functions of the gateway device 22. The controller 410 may be a one or more general processors such as a microprocessor that cooperates with control software. In the present example, the controller comprises two processors 410A and 410B. The processor 410A is a media processor module (media processor) and the processor 410B is a network processor module (network processor for short). The media processor 410A functions include the functions of a front end 414. These functions may include a tuner 414A, a demodulator 414B, a decoder 414C such as a forward error correction decoder and any buffer or other functions. Specific functions of the controller 410 are described in detail below. The processor 410B may be used to control the interfacing with various networks and act as a router and may also act as a modem.

The controller 410 may also include a viewer tracking module 416, a browser tracking module 418 and a recommendation module 420. The viewer tracking module 416 is used for tracking and logging viewing events at the gateway device 22. Ultimately, the viewer history may be logged in a viewer tracking log as will be further described below. The viewer tracking module 416 may track a time that content was watched, a client device associated with the content, the title of the content and if the content belongs to a series. The browser tracking module 418 may track browser activity data related to content viewed on websites through a web browser. The browser activity data may include, but is not limited to, video content viewed partially or in its entirety, content trailers, and data look-ups. The recommendation module 420 is used for generating recommendations corresponding to programs currently available for viewing corresponding to previously watched content and content related to browser activity during a particular time slot. The recommendation module 420 may also generate programs or recordings that are deemed to be future or current programming that the viewer should like based on an analysis of viewing habits of the viewer. The recommendations module 420 may receive the external recommendations list which is coordinated or supplanted by recommendations based on the viewer tracking data and browser tracking data.

In general, the tuner 414A receives the signal or data from the individual channel. The tuner 414A may receive television programming content, program guide data or other types of data. The demodulator 414B demodulates the signal or data to form a demodulated signal or data. The decoder 414C decodes the demodulated signal to form decoded data or a decoded signal. The controller 410 may be similar to that found in current DIRECTV® set top boxes which uses a chip-based multifunctional controller. Although only one tuner 414A, one demodulator 414B and one decoder 414C are illustrated, multiple tuners, demodulators and decoders may be provided within a gateway device 22.

The controller 410 is in communication with a memory 430. The memory 430 is illustrated as a single box with multiple boxes therein. The memory 430 may actually be a plurality of different types of memory including the hard drive, a flash drive and various other types of memory. The different boxes represented in the memory 430 may be other types of memory or sections of different types of memory. The memory 430 may be non-volatile memory or volatile memory or combinations thereof.

The memory 430 may include storage for various operational data collected during operation of the gateway device 22. One type of data storage includes the viewer tracking log 432 obtained and controlled by the viewer tracking module 416. The viewer tracking log (VTL) 432 includes viewer tracking log data that includes data about details of programs that have been watched or played back, including what time that they were watched or played back. The data of the VTL 432 may also include how long they were watched and program details. The program details may include whether the program belongs to a series. Recording deletion data within a digital video recorder may also be included in the data of the VTL 432.

The memory 430 may also include a browser tracking log 432B obtained and controlled by the browser tracking module 418. The browser tracking log 432B includes browser tracking data that includes details of browser activity that includes video content partially viewed or viewed in its entirety, content trailers viewed and data lookups. The data in the browser activity may or may not relate directly to video content activity. The amount of time browsing various websites or watching on-line content may also be tracked.

Another type of memory 430 is the settings and the list information (SLI) memory 434. The SLI memory 134 may store various types of data including set top box playlist data 436 that has the playlist for content saved within the gateway device 22. The playlist data contains content visible to users and content currently non-visible to users. Another type of data is the favorite settings for the gateway device 22. The favorites may be stored in a favorites memory 138. Other types of data may also be included in the SLI memory 434 which is illustrated as an "other" data memory 440. The other data memory 440 may include various types of data including ignored suggestions which correspond to suggestion or recommendation suggestions that were ignored. Another type of data in the other data memory 440 may include the channel subscription data, the blocked channels, adult channels, rating limits set by the gateway device 22, current set top box language, prioritizer data, TV resolution data, to do list data, the conditional access module identifier, and a request identifier. Further, time zone data, time of day daylight savings, status data, aspect ratio data, viewing hours data, quick tune list and a zip code may all be included within the other memory 4140 of the SLI memory 434.

The memory 430 may also include advanced program guide memory 444. The advanced program guide (APG) memory 444 may store program guide data that is received within the system. The program guide data may store various amounts of data including two or more weeks' worth of program guide data. The program guide data from the APG memory 444 may be communicated in various manners including through the satellite 18 of FIG. 1. The program guide data may include a content or program identifiers, and various data objects corresponding thereto. The content identifier may include series data. The first 4 digits may, for example, identify the series. The program guide may include program characteristics for each program content. The program characteristic may include ratings, categories, actor, director, writer, content identifier and producer data. The data may also include various other settings.

The memory 430 may also include a digital video recorder 446. The digital video recorder 446 may be a hard drive, flash drive, or other memory device. A record of the content stored in the digital video recorder is a playlist. The playlist may be stored in the DVR 446 or a separate memory as illustrated.

The memory 430 may also include a cache memory 448. The cache memory 448 may be used to store cached content corresponding to web content under the control of a cache module 450 that will be described further below.

The gateway device 22 may also include a user interface (UI) 456. The user interface 456 may be various types of user interfaces such as a keyboard, push buttons, a touch screen, a voice activated interface or the like. The user interface 456 may be used to select a channel, select various information, change the volume, change the display appearance, or other functions. The user interface 456 may also be used for selecting recommendation and providing feedback for recommendations. The user interface 456 may thus be used for generating a selection signal.

A network interface 458 may be included within the gateway device 22 to communicate various data through the local area network 30 and to and from the wide area network 50 illustrated above. The network interface 458 may include various technologies used alone or in combination such as Wi-Fi, WiMax, WiMax mobile, wireless, cellular, a cable modem, a digital subscriber line (DSL) modem or other types of communication systems. The network interface 458 may use various protocols for communication therethrough including, but not limited to, hypertext transfer protocol (HTTP). The network interface 458 may also include a Bluetooth® interface, a Zigbee® interface or other limited distance RF interface for communicating with devices such as a mobile device.

The gateway device 22 provides two major functions. That is, the gateway device 22 provides video service to the building illustrated in FIG. 1. In the present example, satellite service is provided to the building 28. However, cable and over-the-air video service may also be communicated through the gateway device 22. The gateway 22 is also an aggregator of in-home IP networks and wide area networks. The IP network access service provider may be the same service provider as the television provider.

The network interface 458 provides a modem function that is typically a separately provided function in typical home-based systems. The modem function provided within the network interface 458 may be provided in the same housing as the gateway device. More than one type of modem may be provided within the network interface 458. Although, not all of the modem functions may be operated. That is, when the user receives the gateway device 22, only the system's service providers subscribed to may be provisioned or enabled. Advantageously, the gateway device 22 does not have to communicate through an external device. The gateway device 22 controls the modem functions of the network interface 458 and thus the gateway device 22 can communicate with the wide area network (internet). This reduces the amount of interfacing issues in dealing with a third party modem device. A third party device does not have to be purchased and thus the overall cost to the consumer may be reduced. As will be described below, troubleshooting and integration of functionality provides a user of the gateway device 22 with a more reliable device with increased functionality incorporated therein.

The gateway device 22 may also include a clock 460. The clock 460 may be used to keep track of a current time. The current time may be used to determine a current time slot as described below. The current time may be used to identify the times at which video content or browser content is being viewed. In a sense, the current time may be used as a time stamp for data corresponding to the use or watching of various browser and video content. The time may also be used in self-healing and diagnostics to determine when certain gateway device parameters are being used.

The gateway device 22 includes an initialization module 464. The initialization module may be used for initially setting up the gateway device and the operation of the specific network interfaces set forth therein. More than one type of modem may be incorporated into the network interface 458. The initialization module 464 is used to initialize one or more of the modems for communicating to the wide area network. Further, the interoperability of the modem as well as a router and the front end 414 is initialized in the initialization module 464.

The gateway device 22 may include an aggregation and transformation module 466. The aggregation and transformation module 466 aggregates content from broadband sources, video sources such as the satellite and other sources available through the wide area network. The aggregation and transformation module 466 transforms the content into formats that are usable by the various devices connected to the local area network.

The gateway device 22 may also include a self-learning module 468. The self-learning module 468 is used for self-healing and diagnostics. The self-learning module 468 is a dynamic system that adapts to customer behavior, learns their pattern of service usage, and performs self-healing and diagnostics actions using a dynamic feedback mechanism.

The gateway device 22 may also comprise an interaction flow module 470. The interaction flow module 470 performs a combination of functions at the media processor and network processor that coordinates the functions internally. Ultimately, content arriving by way of the satellite and broadband may be aggregated together. The interaction flow module 470 allows the content to be processed so that the devices coupled to the gateway device 22 may consume the content received from the various sources. The content may be conditioned for delivery within the home network. "Flow" refers to signals flowing into, out of and through the gateway device 22. The flow signals comprise the various types of content as described above.

Figure 5:
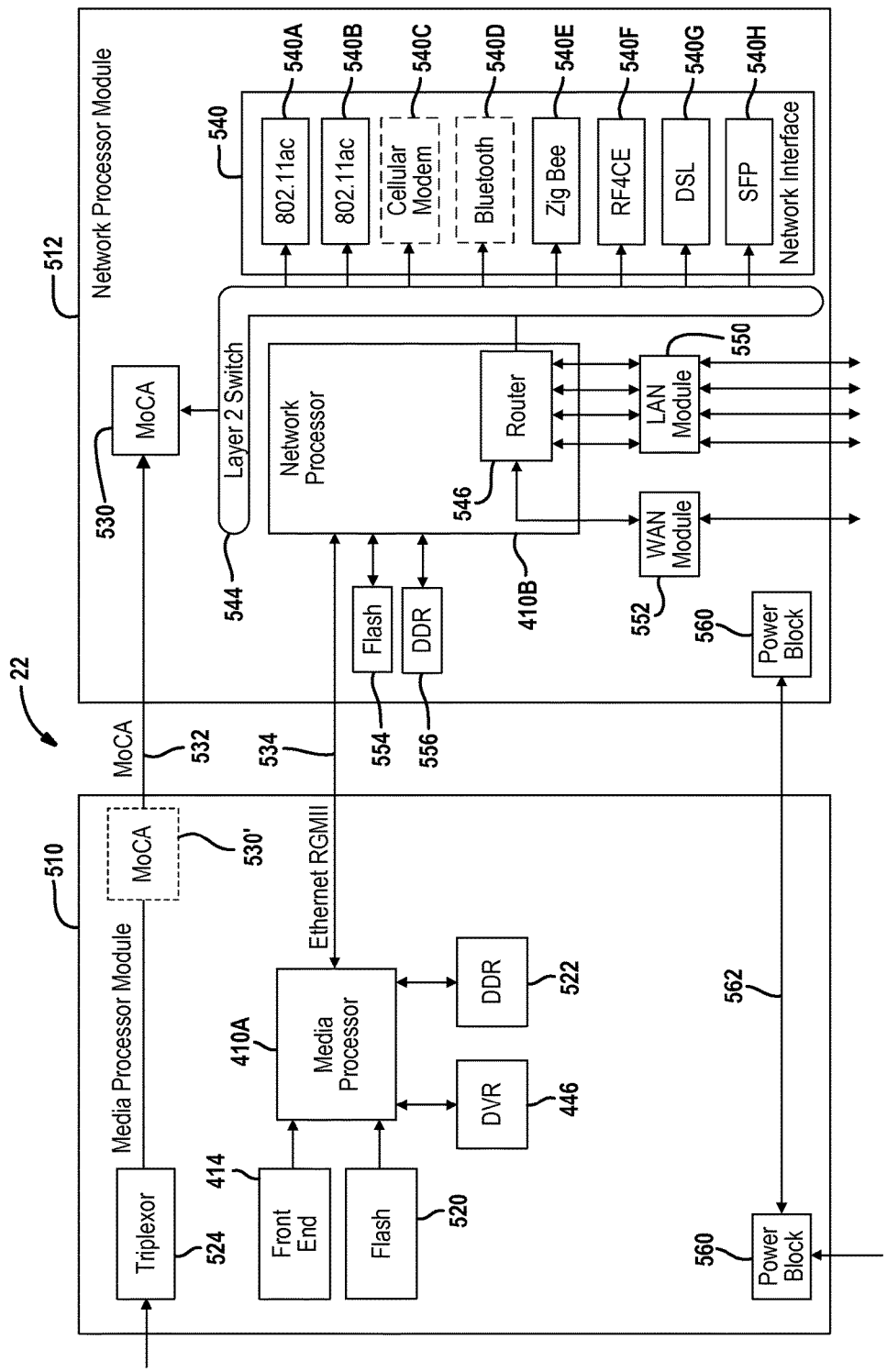
FIG. 5 is a block diagrammatic view of a media processor in relation to a network processor, both of which reside in the gateway device.

Referring now to FIG. 5, a block diagrammatic view of the gateway device 22 is illustrated in further detail with functions of the media processor 410A and the network processor 410B having the functionality blocks associated therewith. In this example, a media processor module 510 includes the media processor 410A and the functions associated therewith. A network processor module 512 has the network processor 410B and the functions associated therewith. The network processor 512 includes the functions of the network interface 458 of FIG. 4 in further detail.

The media processor 410A has memory associated therewith. The memory is broken out in further detail compared to that set forth in FIG. 4. In this example, the DVR 446 is in communication with the media processor 410A. The media processor 410A may also have flash memory 520 associated therewith. The flash memory 520 may be used for storage of critical data, files and images needed for robust operation upon start up. The data files and images are a bare minimum set of files required to bring the system into a normal operational state. Dynamic software updates of software images may also be stored in first memory 520.

The media processor 410A may also be in communication with a double data rate (DDR) synchronous dynamic random-access memory 522. The DDR memory 522 may be used for operating system execution as well as execution of programs and other executables.

The media processor 410A receives content from the front end 414. In the present example, a tuner, demodulator and decoder may be contained within the front end 414. Also in this example, satellite content is received by the front end 414. However, other types of over-the-air or cable-based content may be received.

A triplexer 524 may be incorporated into the media processor module 510. The triplexer 524 provides content from an external connection to the front end 414. The triplexer 524 may also provide content to a multimedia over coaxial alliance format (MoCa®) module 530 located within the network processor module 512. A MoCA® module 530' may be located in the media processor as well. The MoCa® standard allows coaxial cabling to enable whole-home distribution of high definition video content. A MoCa® connection 532 may interconnect the triplexer 524 and the MoCa® module 530.

The media processor 410A and the network processor 410B may be interconnected using a connection bus 534. The bus 534 may be high speed or low speed or combinations of both. The Ethernet or gigabit media independent interface is a high speed connection. The connection bus 534 may be an Ethernet bus or a gigabit media independent interface. A low speed network connection may also be coupled between the media processor 410A and the network process 410B. As will be described in more detail below, the low speed connection may comprise several lines. Of course, other types of formats may be used between the media processor 410A and the network processor 410B.

The network processor module 512 includes a detailed view of the network interface 458. In this example, a network interface 540 may include a first Wi-Fi module 540A, a second Wi-Fi module 540B, a cellular modem 540C and a Bluetooth® module 540D. The Wi-Fi modules 540A and 540B may provide a plurality of connections outside of the network processor module to other devices such as mobile devices and tablet computers. The Wi-Fi modules 540A and 540B may be separate so that different communication frequencies may be used. The cellular modem 540C may be a 3G/4G LTE cellular modem used to couple the network processor to a cellular service provider so that a wide area network connection may be obtained.

The network interface 540A may also include a ZigBee® module 540E. The ZigBee module 540E may communicate and receive ZigBee® formatted signal to and from devices outside the gateway device 22.

The network interface 540A may also include a Remote Control Standard for Consumer Electronics (RF4CE) interface 540F that may be used for remote controls. Network interface 540 may also include a digital subscriber line (DSL) interface 540G. The DSL interface 540G may be used to provide two-way communication of the network processor module 512 and a digital subscriber line such as a telephone line.

The network interface 540 may also include a small form-factor pluggable (SFP) interface 540H. The SFP interface 540H may also be referred to as a mini-GBIC. The SFP interface 540H is an optical transceiver module used to interface with optical fibers to provide two-way communication therethrough. The SFP transceiver may support SONET/DSH Fast Ethernet, Gigabit Ethernet, Fiber Channel, and other communication standards.

The network processor 410B may communicate to the MoCa® module 512 and the modules of the network interface 458 and are coupled through a layer two switch 544. The layer two switch 544 may act as a router to route signals to other devices connected to the layer two switch 544 without having to involve the network processor 410B. This improves the overall flow. However, the layer two switch 544 may be incorporated functionally within the network processor 410B.

A router 546 within the network processor 410B is used to route signals to the WAN from various devices such as the MoCa module 530 and the devices of the network interface 458. The term router may be used for the router 546 alone or in combination with the layer two switch 544.

The network processor 410B may also be in communication with a wired multi-port LAN module 550. By way of example, four ports are illustrated. A WAN module 552 may also be provided. The WAN module may be a one-port gigabit WAN connection. The LAN module 550 allows direct wired access to the network processor 410B. The WAN module 552 provides wired access to the internet through a wide area network connection. Both wired and wireless connections may be used.

The network processor module 512 may also have flash memory 554 that is used for storage of critical settings, configuration and data for reliable bringing up of the system as well as storage of dynamically updated software images and previous image rollback.

The network processor module 512 may also have DDR memory 556 that is used for operating system and program execution.

The media processor module 510 and the network processor module 512 may each have a power block 560 associated therewith. The power blocks 560 may be an individual power supply or be a connector to a power supply of the gateway device 22. The power block 560 of the media processor module may be in communication with the power block 560 of the network processor module through a power connector 562.

Figure 6:
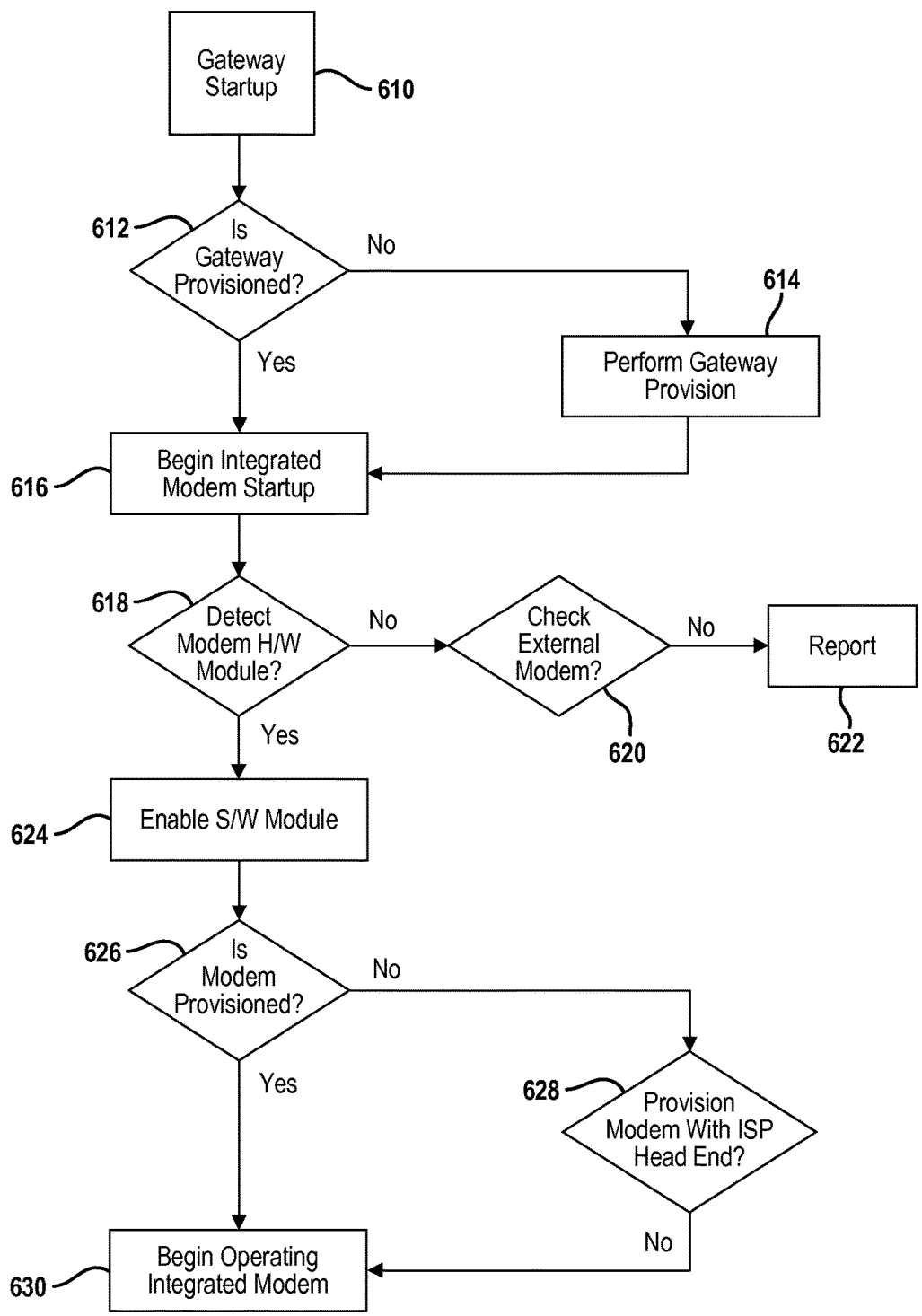
FIG. 6 is a flowchart of a method for enabling communication modules within the gateway device.

Referring now to FIG. 6, a method for the startup of the gateway device is set forth. In step 610 the gateway device is started by providing power or selecting a power or reset switch. In step 612 it is determined whether the gateway device has been provisioned. If the gateway device has not been provisioned, the gateway device is provisioned in step 614. By provisioning the gateway device, direct communication between the gateway device and the wide area network interface is established. The direct connection bypasses an external standalone modem. Communication to the WAN may be performed directly through the wide area network interface. As is illustrated in FIG. 5, a plurality of different types of network interfaces may be provided within the gateway device. One of the network interfaces provides the wide area network interface of the gateway device. Provisioning the gateway device means selecting the desired network interface for communication.

After step 610 and after step 614, step 616 begins the integrated modem startup. Modem refers to one or more of the modules of the network interface. One or more of the devices in the network interface may be used in the gateway device. In step 618 it is determined whether the modem hardware module has been detected. If the modem hardware module has not been detected, the external modem is checked in step 620. A report may be generated in step 622 so that the user may take action.

After step 618 when the hardware module of the modem has been detected, step 622 is performed. Step 622 enables the software module of the modem. Step 624 is performed after step 622 and determines whether the modem has been provisioned. If the modem has not been provisioned, step 626 provisions the modem with the head end of the internet service provider associated with the modem. After steps 626 and 624, step 628 begins operation of the integrated modem because both the modem and the integrated modem have been provisioned as described in the preceding steps.

Figure 7:
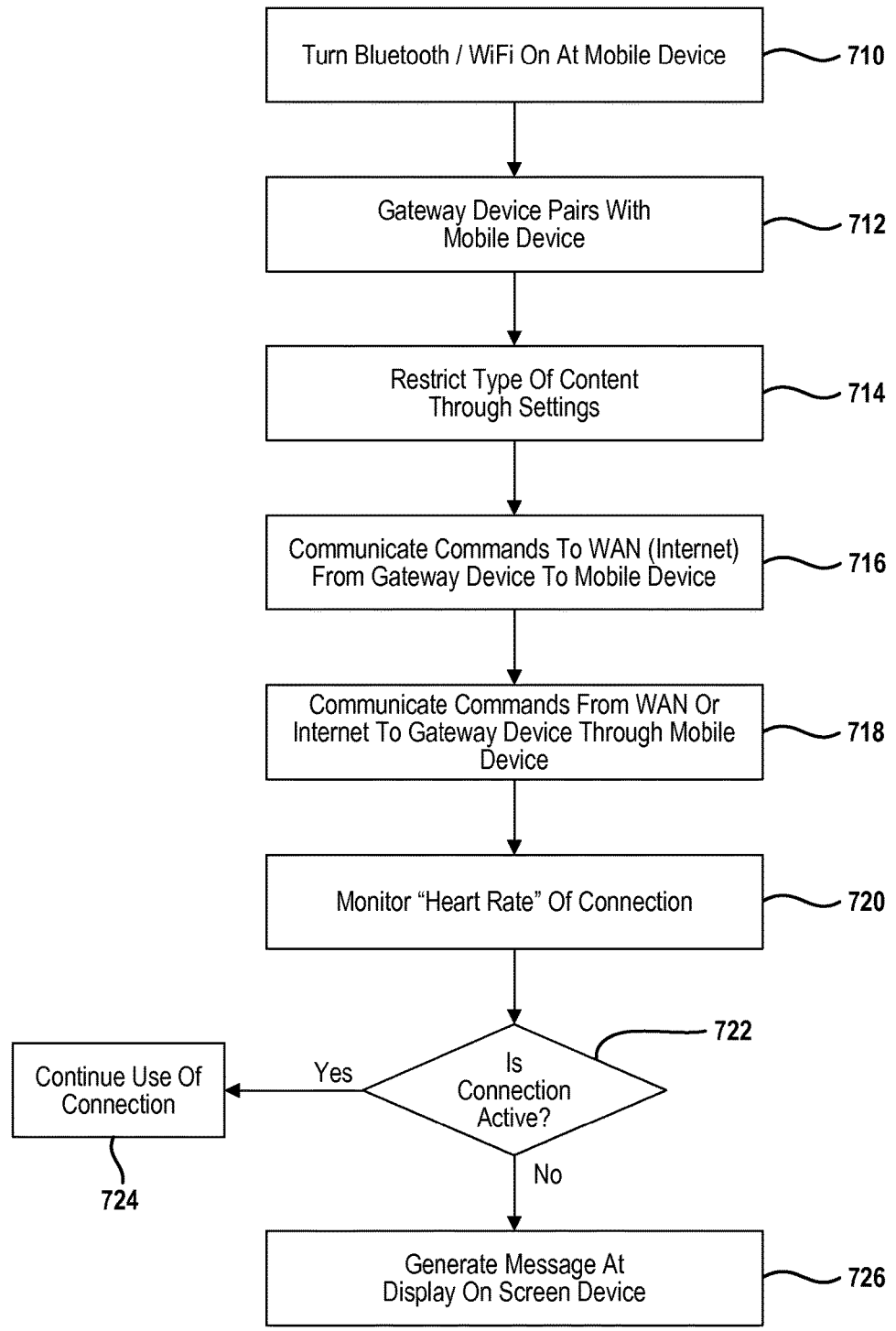
FIG. 7 is a flowchart for a method of using an external device to provide access to a wide area network.

Referring now to FIG. 7, a method for operating the gateway device with a mobile device 54 through a cell tower 52 that is connected to a wide area network 50 is set forth. In this example, it is presumed that a wide area network interface is not incorporated into the gateway device 22. The mobile device 54 is used for connecting the gateway device ultimately to the wide area network 50 of FIG. 1. In step 710 the Bluetooth® or Wi-Fi is turned on at the mobile device 54. In step 712 the gateway device pairs with the mobile device 54. This may be performed in various methods depending upon the type of mobile device. Secret codes or passwords may be used to pair the mobile device with the gateway device. Ultimately, the phone and gateway device recognize each other so that communication signals may be exchanged. Once paired with the gateway device, the gateway device may perform an optional step of restricting the type of content or the timing of content using settings. The user, through a user interface, generates content settings or timing settings to restrict the flow of content through the mobile device. In step 716 commands are communicated to the wide area network, such as the internet, from the gateway device through the mobile device. In step 718 commands are communicated from the wide area network or internet to the gateway device through the mobile device. Steps 714 through 718 may be performed continually until the gateway device is unpaired with the mobile device. This unpairing may take place when the mobile device exceeds the maximum communication distance.

Step 720 monitors the heartbeat of the connection to determine if a connection is still in place. In step 722, when the connection is active, the gateway device and mobile device continue to use the connection through the exchange of signals.

In step 722, when the connection is determined to be inactive by the lack of a "heartbeat" signal, step 726 generates a message at the display of the screen device to notify the user that the system is disconnected or in an error state. The system may take corrective action with or without user intervention.

It should be noted that in step 714 the timing may be restricted. That is, one variant of the method allows the use of a time restriction for restricting use of the mobile device. For example, from 11 pm to 4 am every day the gateway device may make use of the mobile device for communicating with the wide area network. The timing may be set in non-prime time hours so that it is less likely that the user is using the mobile device.

Figure 8:
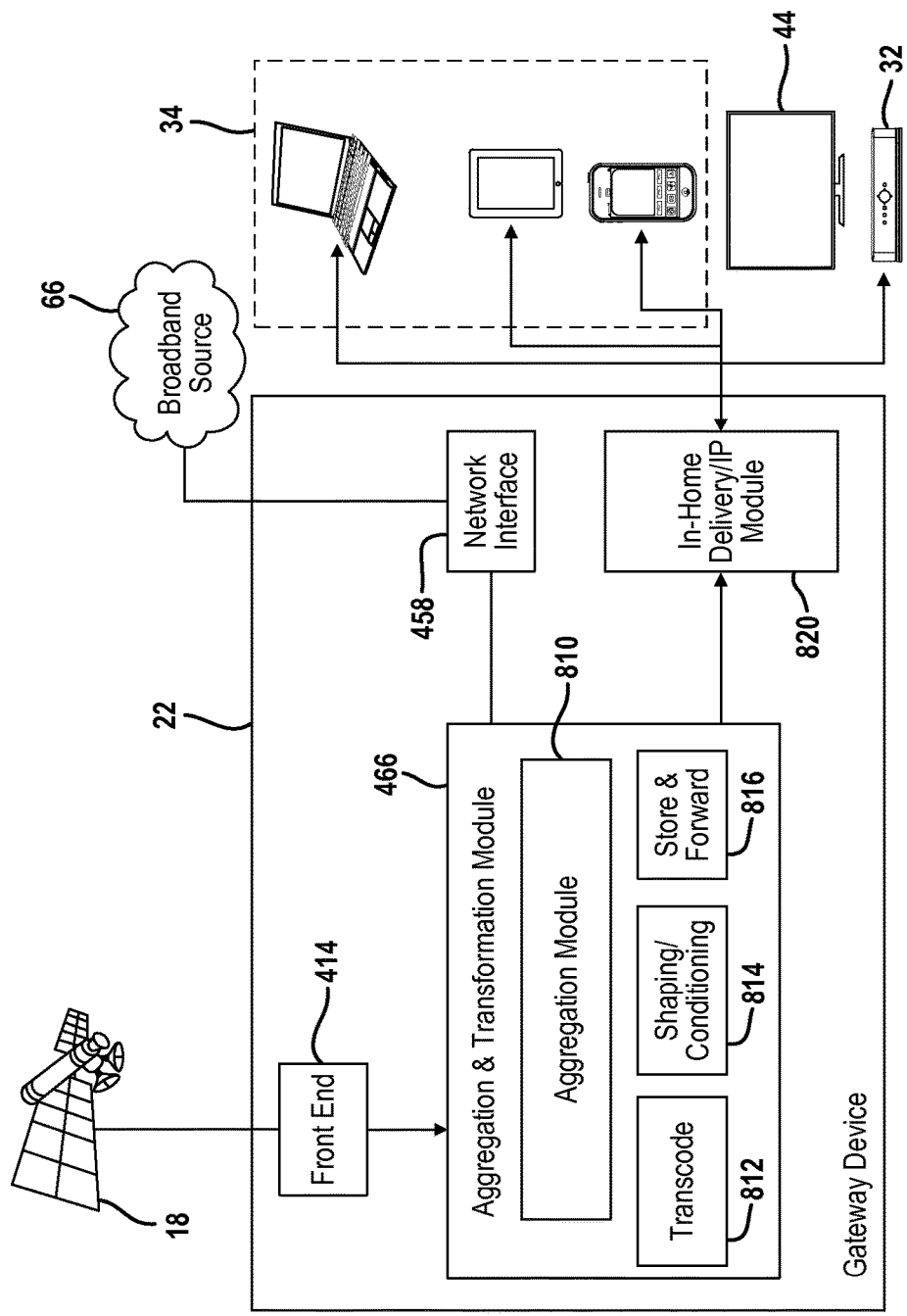
FIG. 8 is a block diagrammatic view of the aggregation and transformation module.

Referring now to FIG. 8, the high level block diagrammatic view of the aggregation and transformation module 466 of FIG. 4 is set forth. The aggregation and transformation module 466 is in communication with the satellite 18 or a cable source through the front end 414 as described above in FIG. 4. The aggregation and transformation module 466 is also in communication with a broadband source 66. An aggregation module 810 obtains the content and allows the content to be transformed for use throughout the local area network. A transcoder module 812 may be used to transcode the content from a first type of encoding to a second type of encoding. A shaping and conditioning module 814 may shape and condition the content electronically to meet the requirements of a receiving device within the local area network based on but not limited to the type of receiving device and the type of content. A storing and forwarding module 816 may be a combination of other devices previously described in FIGS. 4 and 5, such as the digital video recorder or other type of memory and a router. An in-home delivery/IP module 820 may also be a combination of devices previously described. For example, the layer two switch 564 may be used for the distribution of content through the system to various user devices through the local area network. The content may also be communicated to the client devices through the in-home delivery IP module 820. Screen displays, including playlists or content available lists may be provided. It should be noted that the content may be changed to an IP protocol which may be sent over a MoCa® format, through Wi-Fi or through an Ethernet connection.

Figure 9:
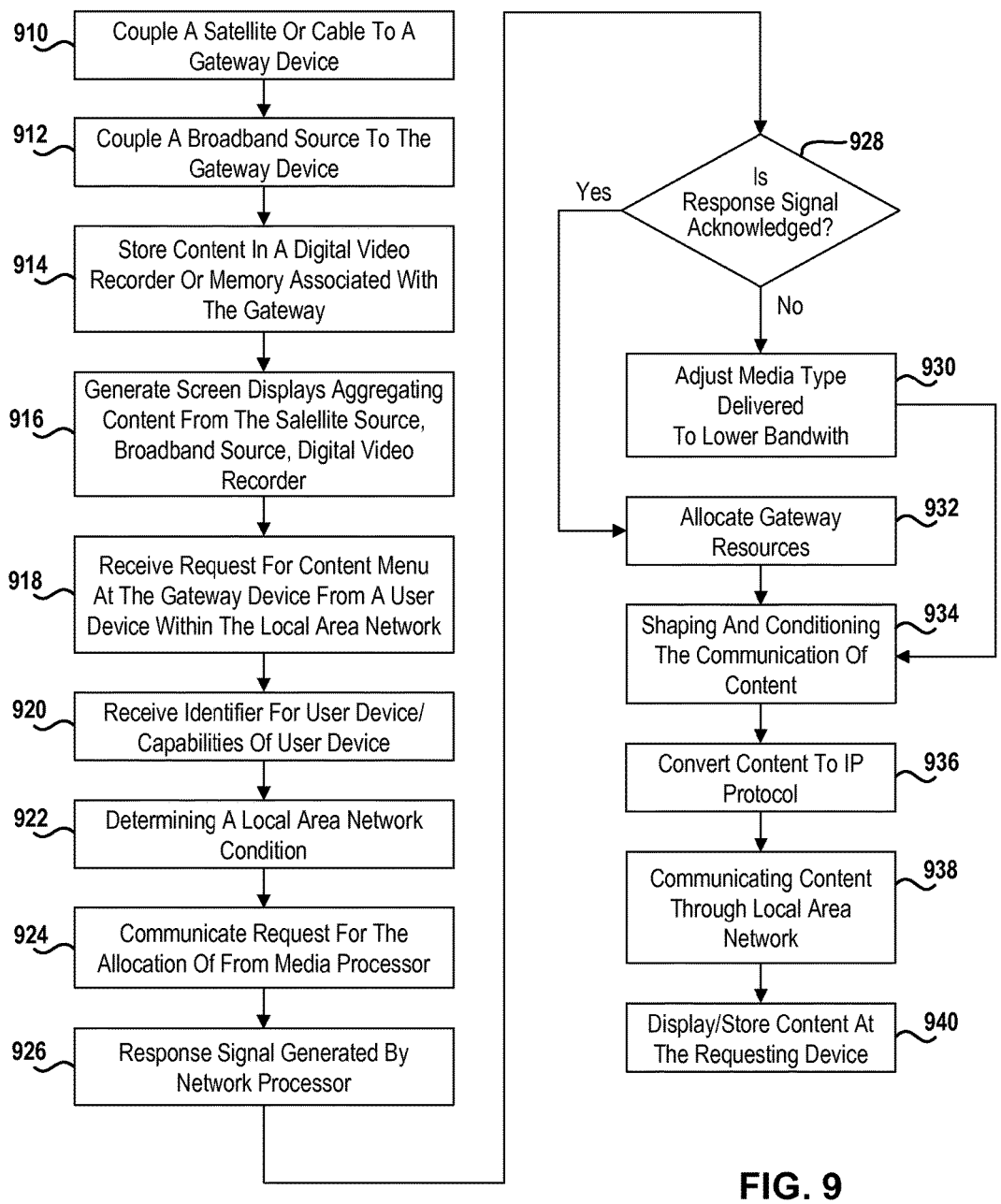
FIG. 9 is a flowchart of a method of reserving bandwidth within the gateway device.

Referring now to FIG. 9, a gateway device is coupled to a video content source such as a satellite source or a cable source in step 910. The satellite source and cable source are broadcast sources. However, they may also be on-demand and pay-per-view sources. The gateway device is also coupled to a broadband source in step 912. As mentioned in FIG. 8, the broadband source and the satellite source may be in communication with an aggregation and transformation module 466.

In step 914 content is stored in a digital video recorder or other memory associated with the gateway device. In step 916 a screen display is generated that aggregates the content from the satellite source and the broadband source as well as the content that is stored within the digital video recorder. By providing content that is available from the broadband source, satellite source and video recorder, an increased amount of content is available.

In step 918 a listing request for content menu is received at the gateway device from the user device within the local area network. In step 920 an identifier for the user device and/or the capabilities of the user device is received at the gateway device. In step 922 a local area network condition is determined. A condition may correspond to the amount of content being communicated through the system. That is, the overall bandwidth use at the current time may be one condition. Another condition of the local area network may be the forecasted amount of use. For example, certain actions may be scheduled to be performed. The type of traffic may be another condition. Some traffic may have higher priority than other traffic. For example, the network signals for current streaming video traffic may have a higher priority over data analysis communication to a remote site. The resources of the gateway are reserved in response to the network condition, the gateway conditions and the request for content. This may be performed by the media processor sending a request "reservation signal" to the network processor in step 924. The network processor may send a response signal, an acknowledge signal (ACK) or a not acknowledge signal (NAK), depending upon the real time availability of bandwidth to satisfy the request. After step 924, a response signal is generated by the network processor. In step 928 it is determined whether the response signal is an acknowledge signal (ACK). When the response signal is a not acknowledge signal (NAK), step 930 adjusts the media type delivered to lower the bandwidth.

Referring back to step 928, when the response signal is an acknowledge signal (ACK), step 932 allocates or reserves the gateway resources. For example, bandwidth may be reserved at the gateway device as an allocated resource for communicating the requested content based upon the condition. As mentioned above, various conditions may allow for increased or decreased bandwidth allocation for a particular piece of content. The reservation of bandwidth may be immediate or for future bandwidth. Other allocated or reserved resources include hardware queues, software queues, runtime memory, ingress/egress buffer resources, hardware accelerator processing queues and CPU timeslices. After steps 930 and 932, step 934 shapes and conditions the communication of the content at the gateway device. The conditioning may be done based on the content type. For example, movie content may be conditioned differently than internet news updates. The amount of bandwidth used by content may be allocated. However, when bandwidth becomes available, content bandwidth allocations may be increased for other content. The content may also be shaped. Shaping the content means changing or restricting some flow signals through the gateway device while allowing other flow signals to maintain maximum speed.

In step 936 the content may be converted into an IP protocol. In step 938 the content in the IP protocol is communicated through the local area network to the requesting device. The content may be stored or displayed at the requesting device in step 940.

Figure 10:
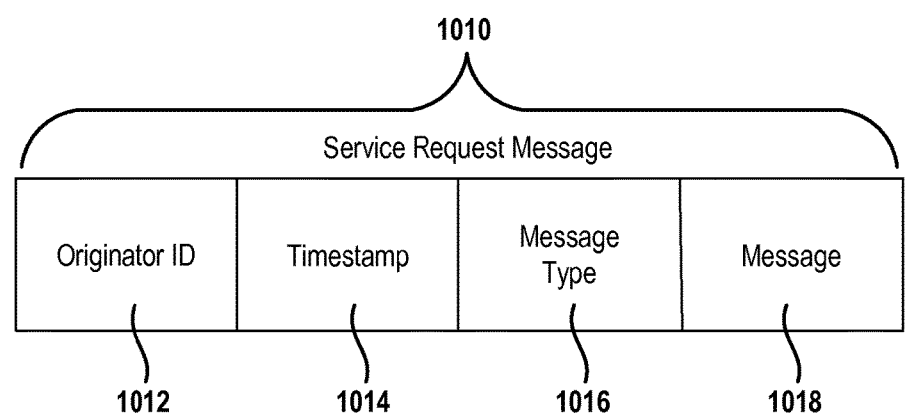
FIG. 10 is a diagrammatic view of a service request message.

Referring now to FIG. 10, the request for content or service through the local area network may be formatted in a particular format. A request message 1010 may include an originator ID 1012 that corresponds to a unique identifier for the user device. A time stamp 1014 may also be provided within the service request message. The time stamp may correspond to the time that the message was communicated. A message type 1016 may also be included within the service request message 1010. The message type may include various types of messages including a request for content from the satellite device, a request for content from the browser, a request for information or other types of requests. The service request message may also include a message 1018 that includes various data that triggers a response at the gateway device. For example, a request for content may include a content identifier within the message 1018.

Figure 11:
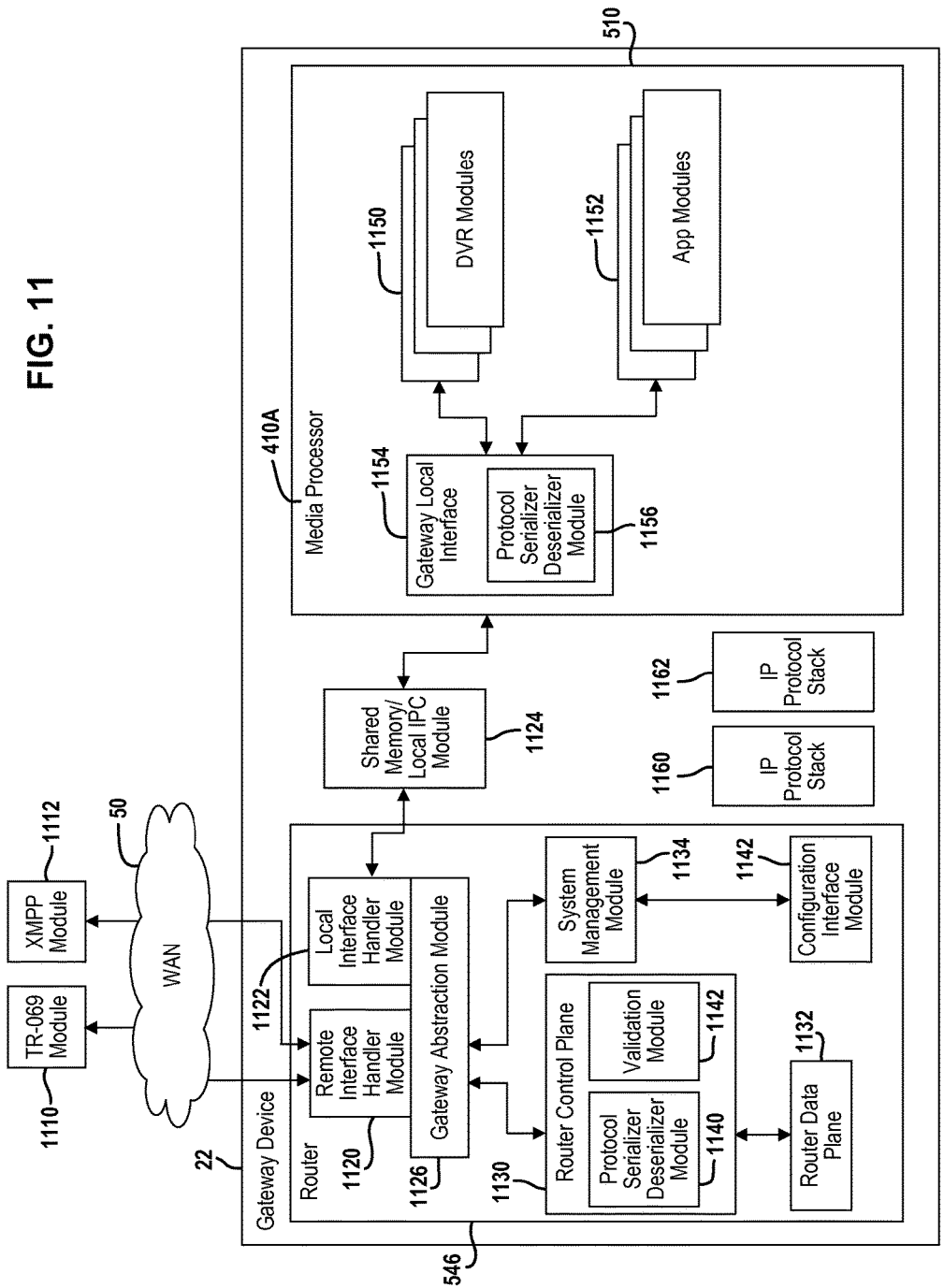
FIG. 11 is block diagrammatic view of a router relative to a media processor.

Referring now to FIG. 11, a block diagrammatic view of the layer two switch or router in relation to the media processor module 510 is set forth. The router 546 is in communication with TR-069 module 1110 and an XMPP module 1112. The TR-069 module 1110 defines an application layer protocol for remote management of end user devices. The TR-069 module 1110 provides communication between the router and various configuration servers. The XMPP module 1112 is an extensible markup language for communications protocol that is message-oriented. It is used for various types of signaling and the like. The TR-069 module 1110 and the XMPP module 1112 represent communication to various devices outside of the gateway device 22 through the wide area network 50. The router 546 communicates to external devices using a remote interface handler module 1120.

The router 546 communicates to the media processor 410A through a local interface handler module 1122. The local interface handler module 1122 communicates through a shared interface module such as a shared memory/local IPC module 1124. The shared memory may be one of the types of memories described above relative to FIG. 4 or 5. The shared memory/local IPC module 1124 represents a shared communication channel between the router module 546 and the media processor module 410A.

The router 546 also includes a gateway abstraction module 1126. The gateway abstraction module 1126 is used for abstracting signals that are communicated through the remote interface handler module 1120 and the local interface handler module 1122. The gateway abstraction module 1126 is in communication with the router control plane 1130. The router control plane 1130 is in communication with the router data plane 1132. The gateway abstraction module 1126 is also in communication with a system management module 1134. The system management module is in communication with a configuration interface 1136.

The router control plane 1130 includes a protocol serializer/deserializer module 1140 and a validation module 1142. The protocol serializer/deserializer module 1140 deserializes the control signals from the gateway abstraction module 1126 in route to the router data plane 1132. The protocol serializer/deserializer module 1140 serializes the signals from the router data plane en route to the gateway abstraction module 1126.

The system management module 1134 and the configuration interface module 1136 are used for managing the gateway abstraction module 1126 and controlling the routing of signals to the remote interface handler module 1120 or the local interface handler module 1122.

The media processor 410A may include DVR modules 1150 and gateway application modules 1152. The DVR modules 1150 store various media content as described above. The DVR modules 1150 may include the DVR itself as well as the control for storing data within the DVR module 1150 and retrieving the data for the DVR module 1150.

The application modules 1152 provide various controls or perform various functions for the gateway device 22. Various types of application modules 1152 may be provided depending upon the functions desired in the gateway device 22. Applications may be used to provide information to the gateway device 22 or may be used to obtain information from the gateway device 22.

A gateway local interface 1154 communicates between the shared memory/local IPC module 1124 and the DVR modules 1150 and the application modules 1152. In general, the DVR modules 1150 and the application modules 1152 request various services such as the creation of quality of service flows using a quality of service flow signal, teardown of quality of service flows, dynamic session creation and session deletion signals, removal of firewall entities for certain protocols, query for internet connectivity, providing TR-069 data to the router 546 for consolidation, varying router/networking parameters, providing notification to the router 546 of DLNA/streaming events (creation and deletion of streams) and providing notification to the router of RVU session and creation/deletion. The service request signals may have a timestamp for bookkeeping purposes.

The shared memory/local IPC module 1124 receives serialized communication signals from the protocol serializer/deserializer module 1140 by way of the local interface handler/module 1122. The gateway local interface 1154 communicates serialized signals from the DVR modules 1150 and application modules 1152 through the local interface handler module 1122, the gateway abstraction module 1126 and the router control plane 1130. In particular, the serialized signals from the media processor 410A are deserialized at the protocol serializer/deserializer module 1140.

The gateway local interface 1154 includes a protocol serializer/deserializer module 1156 that serializes and deserializes the content between the media processor 410A and the router 546. As mentioned above, the commands and data from the DVR modules 1150 and the application modules 1152 are serialized to form serialized request signals for communication to the router module 546. The media processor 410A may perform various functions based on the response signals from the router. A screen display with data received from the router 546 may be generated. A pair of IP protocol stacks 1160, 1162 may be bypassed when communication signals are exchanged between the media processor 410A and the network processor 410B and more specifically the router 546, although two IP protocol stacks 1160, 1162 are illustrated.

Figure 12:
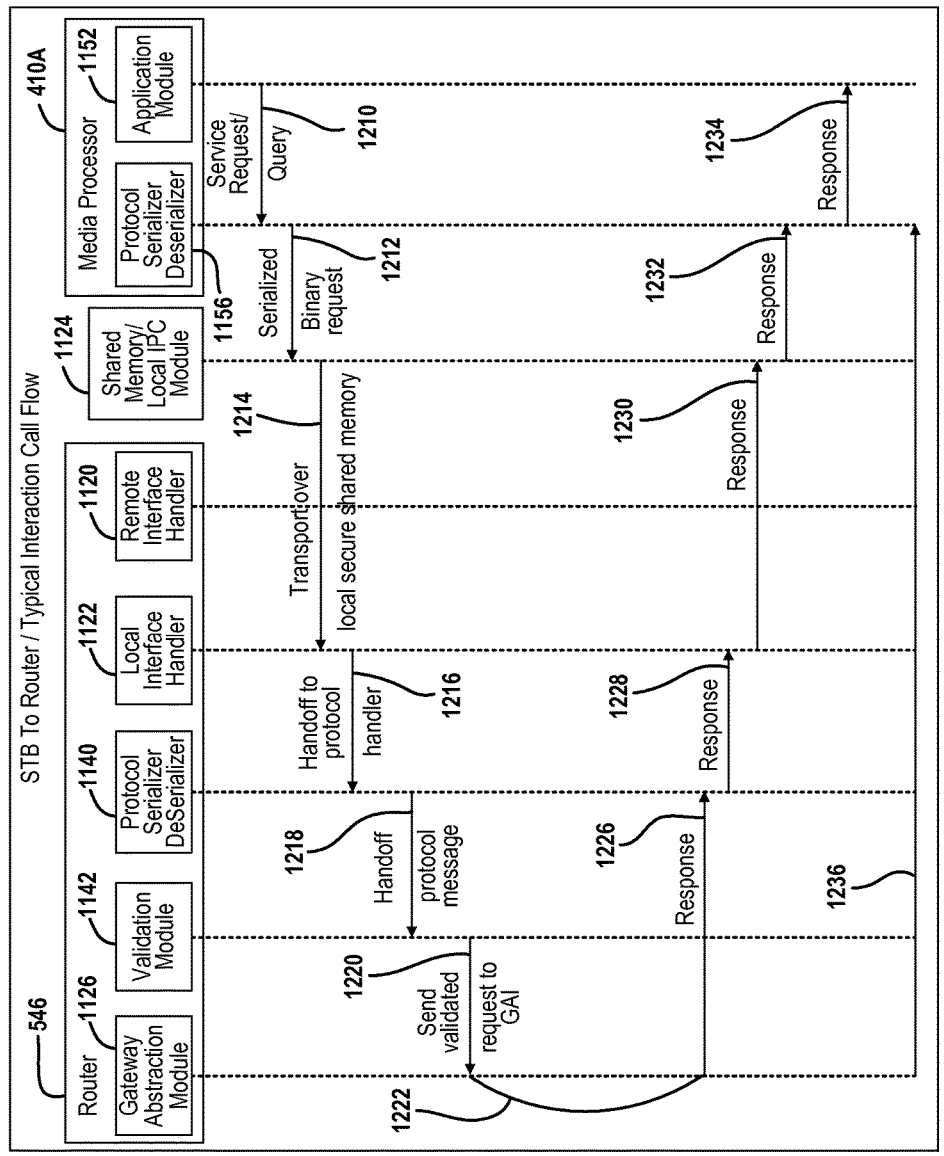
FIG. 12 is call flowchart of the interaction between the router and the media processor.

Referring now to FIG. 12, a signal flow between the media processor 410A and the router 546 are set forth. The application module 1152, in this example, generates a serialized service request or query 1210 that is serialized at the protocol serializer/deserializer 1156. In the following example, a service request signal is provided. The service request signal may include an identifier such as an originator identifier to uniquely identify the originator of the request. Of course, a query request signal may also be substituted for the service request. The protocol serializer/deserializer 1156 generates a serialized request signal which is a binary request that is communicated to the local shared memory/IPC module 1124. The local IPC module 1124 communicates the content to the local interface handler 1122. Because the signal is intended for use within the gateway device 22, the remote interface handler 1120 is bypassed. The shared memory/local IPC module 1124 transports the serialized binary request signal 1212 through a local secure shared memory as indicated by the arrow 1214. Step 1216 hands off the protocol from the local interface handler 1122 to a protocol serializer/deserializer module 1140. The protocol serializer/deserializer 1140 deserializes the signal. The validation module 1142 may validate the deserialized signal. The deserialized signal is sent from the validation module 1142 to the gateway abstraction module 1126 which obtains the desired data. The gateway abstraction module queries or services requests through interaction with the underlying router components such as the router data plane 1132. This is represented by the arrow 1222. Ultimately, a response signal 1226 is generated at the gateway abstraction module 1126. The gateway abstraction module 1126 returns the response signal 1226 to the local interface handler 1122 as represented by the arrow 1228. The response signal is then communicated from the local interface handler 1122 to the shared memory/local IPC module 1124 as represented by arrow 1230. The protocol deserializer 1156 receives the signal from the local IPC module 1124 as represented by arrow 1232. The local protocol serializer/deserializer 1156 deserializes the signal and communicates the deserialized signal to the application module 1152 as represented by arrow 1234. As mentioned above, one of the DVR modules 1150 may be substituted for the application module 1152.

Both the DVR modules 1150 and application modules 1152 may request data from sources internal or external to the gateway device through the router 546. In response to the response signal a screen display may be generated in the gateway device from the media processor 410A.

As is described above, the router 546 and the media processor 410A provide bidirectional communication using a sessionless request-response protocol that is serialized into a binary format over the communication channel between the two entities of the gateway device 22. By providing bidirectional communication, the information between the router 546 and the media processor 410A allow better quality of services, since all of the communication is controlled within the gateway device 22. The transport of the signals is performed using a shared memory which bypasses an IP protocol stack of the gateway device 22 which allows more efficient communication. The message is serialized into a compact binary format. As mentioned above in FIG. 11, the time stamp of the origination allows a recipient device to process the messages in a given window, and thus discarded stale messages outside of the window are not processed. The system management module 1134 determines whether the systems fall outside a pre-established window for processing. By providing both a remote interface handler module 1120 and a local interface handler module 1122, messages may be easily and quickly processed depending upon the desired direction and origin.

The gateway abstraction module may also communicate an asynchronous response 1236 to the media processor 410A. The responses may come to the media processor after a significant delay related to a request and events that occur.

Figure 13:
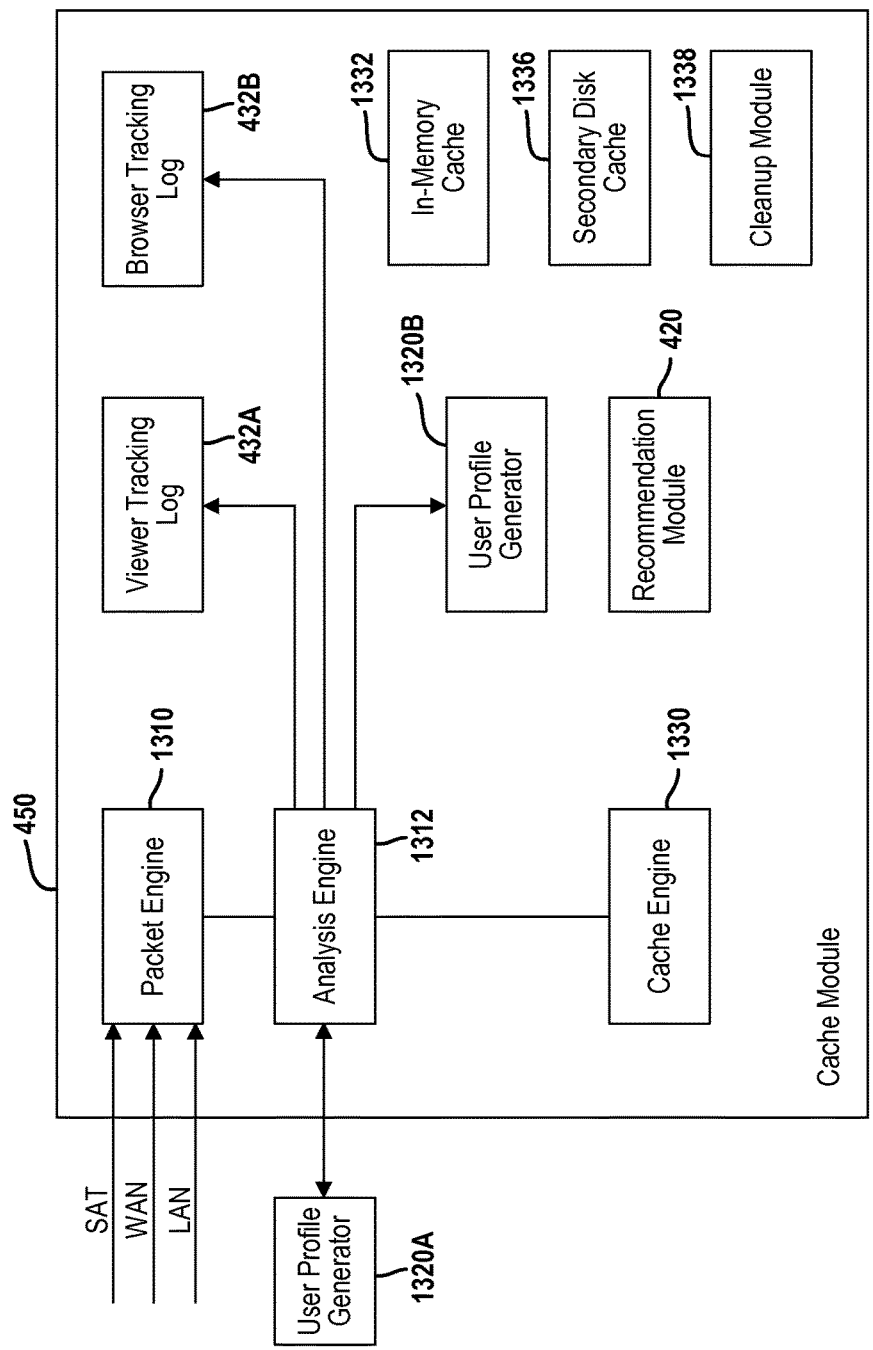
FIG. 13 is a block diagrammatic view of a cache module.

Referring now to FIG. 13, the cache module 450 of FIG. 4 is set forth in further detail. The cache module 450 has access to all the packet flows through the gateway device 22. Statistics may be collected for a variety of browsing habits based upon the use of the satellite tuner and front end as well as non-video or non-satellite, such as web browsing. Ultimately, the cache module 450 may be used for a variety of purposes including, but not limited to, the caching of audio, video and web pages to enhance the user's experience and reduce latency. The cache module 450 may also be used to pre-position video advertisements (ads) within the gateway device to reduce the wide area network traffic when using specific applications. For example, ads may be requested at a mobile device when the user is within certain applications. By pre-positioning advertisement content within the gateway device, the reliance on the interface with the wide area network is reduced. Further, by providing an improved user profile that includes both web browsing and video content use, a more complete user profile is obtained. Further, a reduced amount of caching compared to caching everything may be obtained.

The cache module 450 includes a packet engine 1310 that is used to analyze the packets being exchanged within the gateway device 22. The packet engine 1310 monitors the packets leaving and entering the gateway device 22 from the wide area network. The packet engine 1310 also receives satellite television packets to determine the content being watched. Local area network packets may also be monitored. The packet engine 1310 provides raw data to an analysis engine 1312.

The analysis engine 1312 may analyze the content and generate a viewer tracking log 432A and the browser tracking log 432B. The analysis engine 1312 may also be in communication with a user profile generator 1320A or 1320B. The user profile generator 1320A may be located external to the gateway device 22 through the WAN. The user profile generator 1320B may be located within the cache module 450 or another part of the gateway 22. The functions of the user profile generator 1320A, 1320B may be similar and thus referred to as a user profile generator 1320 in the following description. The user profile generator 1320 may generate a user profile based upon the viewer browsing and viewer watching profiles. By analyzing the packets into and out of the gateway device 22, the user profiles may be generated. User profiles may be generated in various ways, including storing searches from a web browser, storing searches within a video streaming service, storing identifiers from streaming video services, and storing web page identifiers for browsed web pages.

User profiles may be generated for individual users or more generally for the overall users of the system. The profiles may be time based, as mentioned above. Predetermined time periods may correspond to different periods of use, thus different types of content may be browsed or different users may view different types of programming. For example, time periods may be every hour, half hour or a multi-hour time block.

The analysis engine is in communication with a cache engine 1330. The cache engine 1330 acts upon content that is cached and pre-positions content within the gateway device 22. The cache engine 1330 may store content within the memory 430 of the gateway device as illustrated in FIG. 4. The cache engine 1330 may cache web pages. For example, if a user browses FoxNews.com after arriving home between 6 pm and 6:30 pm on a weeknight, the cache engine 1330 may cache the web content just prior to the typical content use time. In another example, a particular website such as an internet mail website may be browsed to. The gateway device 22 may obtain the data from the webmail site and store the data within the gateway device 22. The cache engine 1330 may control the obtaining of the cached data based upon user profiles, which in turn are based upon the viewer tracking log and/or the browser tracking log. The cached data provides an improved user experience since the data is available. The data may be obtained in the background, and the overall user experience may be improved by instantly providing content and not interrupting or reducing the speeds of other services to obtain the data.

The cache engine 1330 may also be used to cache content from the satellite or other video providing services. By using the viewer tracking log and the browser tracking log, the user profile generator 1320 may generate a profile that is used by the cache engine to monitor the programming and store programming within the digital video recorder of the gateway device 22. The cache engine 1330 may also be used for caching advertisements that are to be displayed during broadcast, during stored video content playback, or during web browsing. Pop-up windows and the like may be generated for advertisements that may be populated by advertisement content stored within the memory of the gateway device.

The analysis engine 1312 may also be in communication with the recommendation module 420 illustrated in FIG. 4. The recommendation module 420 may use the viewer tracking log 432, the browser tracking log 432B, the user profile from the user profile generator 1320 and analysis thereof to generate content recommendations for the user. Recommendations may be generated in various ways, including providing posters on a recommendation screen display or providing a simple list of recommended content titles. A short description or selector selection buttons for obtaining descriptions may also be displayed. Recommendations may be performed by reviewing the program guide data and the data stored within the digital video recorder of the gateway device 22. The content recommendations are tailored to the user of the gateway device 22 through the analysis engine. Relevant data may best be provided to users regarding recommended video content.

The cache module 450 may also include an in-memory cache 1332. The in-memory cache 1332 may increase the performance of the gateway by holding frequently-requested data in the memory and therefore reducing the need for database queries or other queries to obtain the data.

The cache module 450 may also include a secondary disk cache 1336. The secondary disk cache 1336 may be used to improve the time it takes to read or write to the digital video recorder (hard disk). A primary disk cache may be included within the digital video recorder. By providing a secondary disk cache 1336, overall system performance may be improved.

The cache module 450 may also include a cleanup module 1338. The cleanup module 1338 may perform heuristics based on cleanup of cache content when a maximum amount of content (watermark) is reached.

Figure 14:
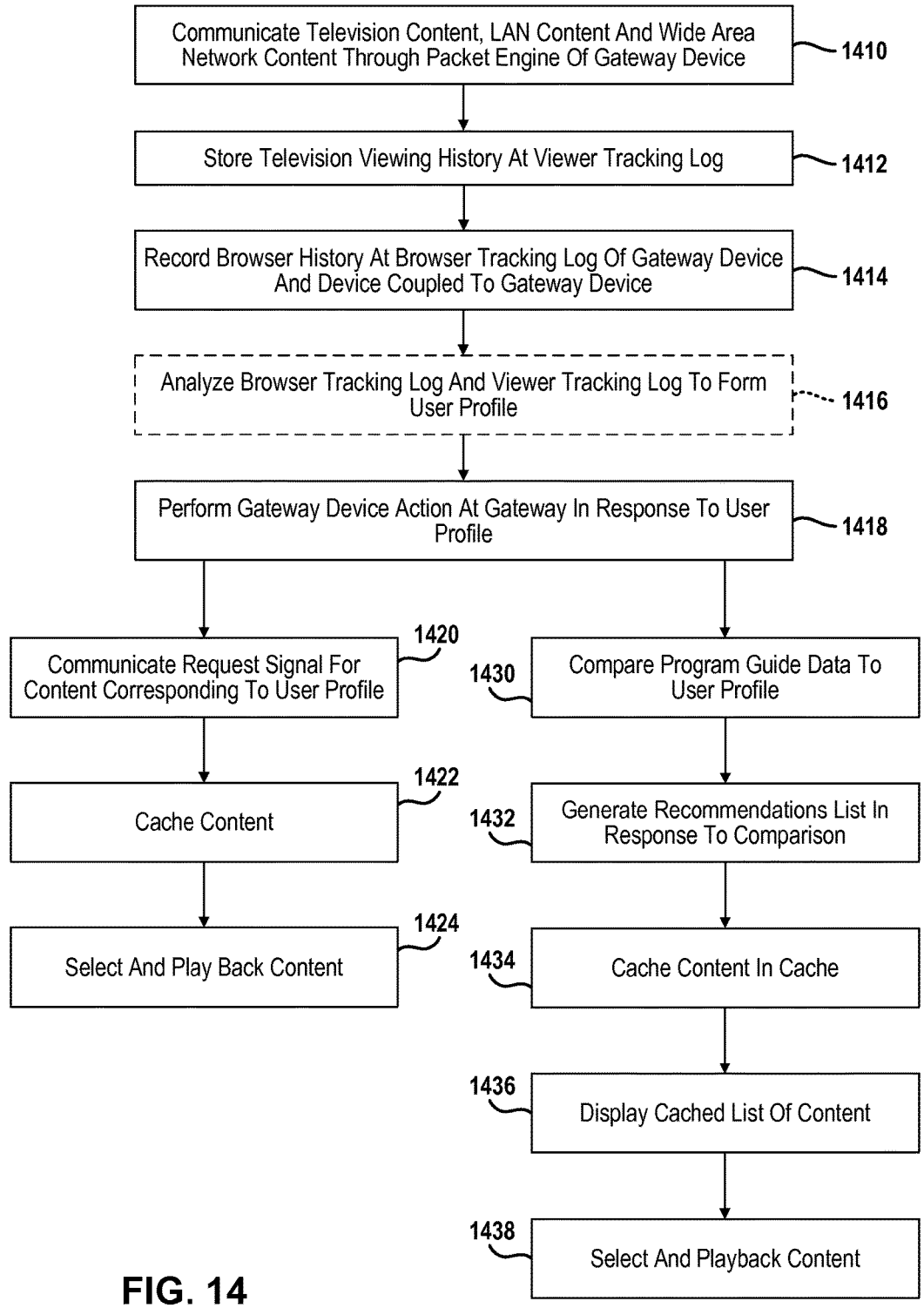
FIG. 14 is a flowchart of a method for obtaining content recommendations.

Referring now to FIG. 14, a method for generating content recommendations is set forth. In step 1410 television content, LAN content and wide area network (WAN) content are communicated through a packet engine of the gateway device 22. In step 1412, television viewing history is stored at the viewer. This may be performed in the viewer tracking log. In step 1414 the browser history is recorded at the browser tracking log of the gateway device. The browser history may be both of the wide area network and the local area network. The browsing tracking log and the viewer tracking log may be analyzed in the analysis engine to form a user profile in step 1416. The user profile may be determined within the gateway device 22 or may be exported to an external profile generator that is communicated to through the wide area network.

In step 1418 the gateway device performs an action in response to the user profile. In this example, a first action is set forth in steps 1420 to 1424. In step 1420 a request signal for content that corresponds to the user profile is generated. The content may be cached in step 1422. In step 1424 the user may select the content and play back the content at the gateway device. The content obtained and played back in steps 1420-1424 corresponds to video-on-demand content that can be requested at any time.

Steps 1410 through 1418 may also be used to obtain broadcasted content. Broadcasted content is content that is broadcasted on a predetermined channel at a predetermined time. A second example of an action is set forth in steps 1430 to 438. Step 1430 compares program guide data that corresponds to broadcasted content to the user profile. In step 1432 a recommendation list may be provided in response to the step of comparing. In step 1434 content may be cached that corresponds to recommendations or the user profile. The cached list of content may be displayed in step 1436. After step 1436, step 1438 allows the content to be selected and the content played back. That is, the list of content may be displayed at the gateway device or at a requesting user device or client device. The content selection signal may be generated at the client or other user device and communicated to the gateway device. The gateway device may retrieve the content for playback from within the memory of the gateway device. The content may be processed according to the capabilities of the requesting device. The content may be displayed on a display associated with the requesting device.

Figure 15:
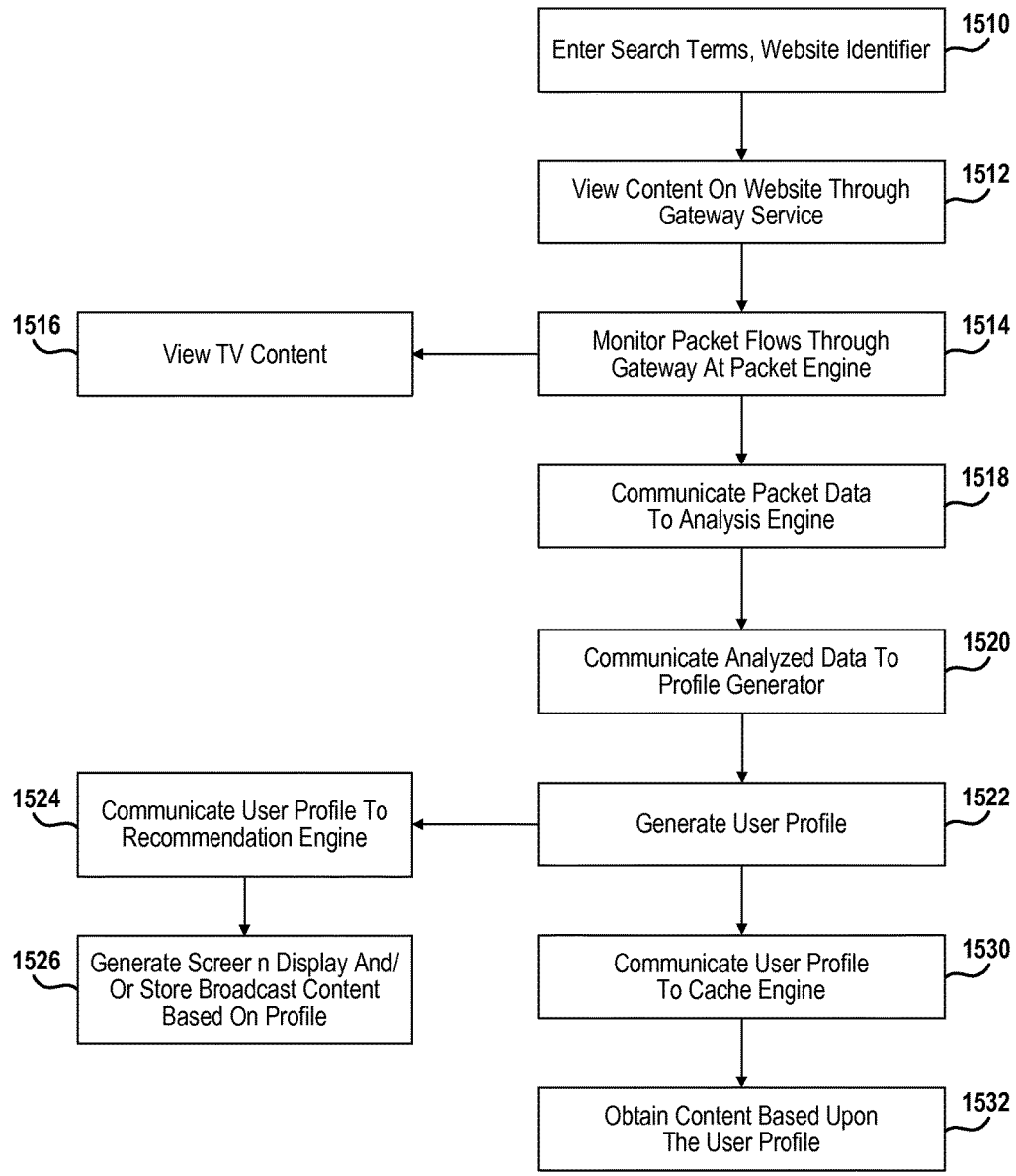
FIG. 15 is a flowchart of a method for generating profiles that are used for generating content recommendations.

Referring now to FIG. 15, a method for generating a browser profile is set forth. In step 1510 the search terms, website identifiers or other identifiers are entered in to a web browser or other wide area network interface. In step 1512 content may be viewed on a website through the gateway device. In step 1514 packet flow signals are monitored through the gateway device. Step 1516 provides television content to step 1514 so that flow signals of television content and content on websites are monitored. In step 1516 content may be cached according to the user profiles developed in response to browser activity or television viewing activity or both. Cached content is stored in the memory of the gateway device in step 1516. Step 1518 communicates the packet data to an analysis engine which analyzes the data. In step 1520 the analysis engine may communicate the analyzed data to the profile generator. The profile generator may be web based or may be gateway device based. In step 1522 a user profile for the gateway device is generated. In step 1524 the user profile is communicated to the recommendations engine. In step 1526 a screen display may be generated for recommendations that comprise a recommendations list. Broadcast content may also be recommended as well as stored content. Broadcast content may also be recommended for future content.

Referring back to step 1522, step 1530 may provide the user profile to a cache engine. The cache engine may obtain content such as browser content or other video content based upon the user profile in step 1532. Web based video content may also be stored within the gateway device in response to the user profile. The web based content may also appear in the recommendations list.

Figure 16:
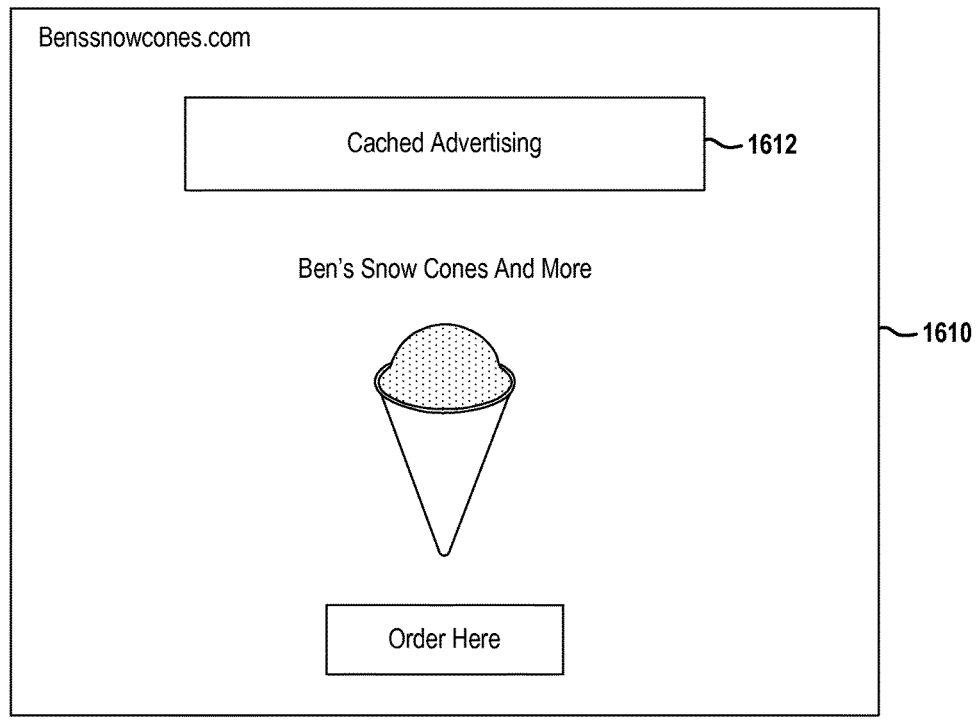
FIG. 16 is a screen display of cached advertising relative to a website display.

Referring now to FIG. 16, a screen display for a web browser 1610 for a webpage "Benssnowcones.com" is illustrated. The web browser 1610 is displaying a web page (browser display) for the business Ben's Snow Cones. Ben's Snow Cones may also have a cached advertising window 1612. The cached advertising window 1612 may present a cached advertisement that was prestored by the cache engine. The cached advertising may also be related to the subject matter of the website. For example, the cached advertising window 1612 may be related to food or food services. Ben's Snow Cones is a food service related website.

Figure 17:
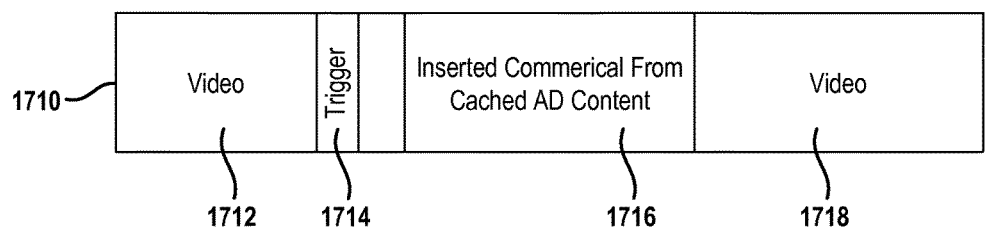
FIG. 17 is a diagrammatic view of a video signal having an inserted commercial advertisement therein.

Referring now to FIG. 17, the cached advertising content may be communicated in a video signal 1710. The video signal 1710 may include video information 1712 and a trigger 1714. The trigger may cause the gateway device 22 to retrieve cached advertisement content from the memory of the gateway device. The cached advertisement is inserted in the advertisement area 1716 of the video signal that is to be displayed on the display. The video then resumes at 1718 after the advertisement has played out.

Figure 18:
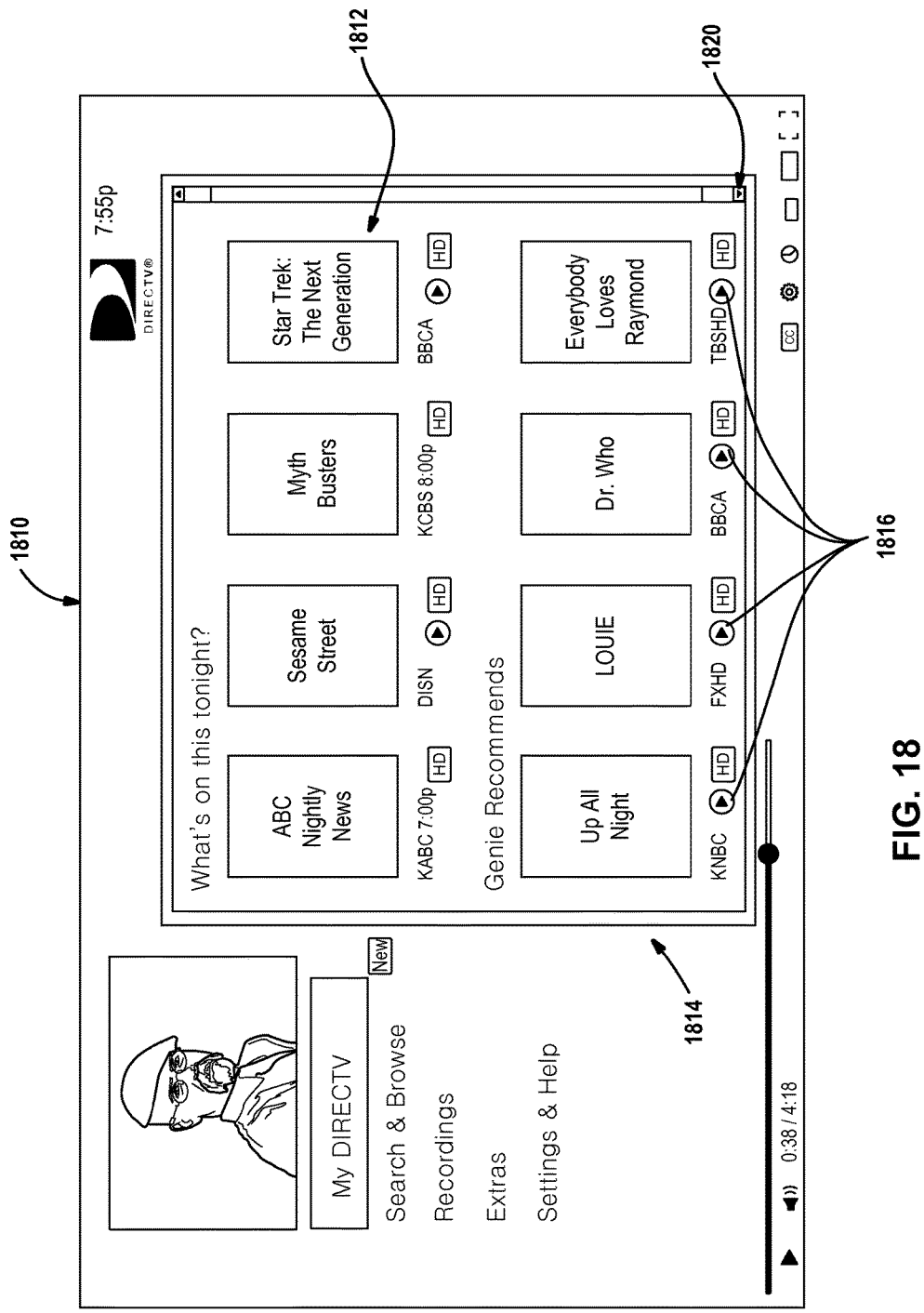
FIG. 18 is a screen display illustrating content recommendations.

Referring now to FIG. 18, user interface 1810 having a current broadcast portion 1812 entitled "What's On" and a recommended recording portion 1814. The content in the portion 1814 is content that is either fully or partially recorded within the gateway device 22. As mentioned above in FIG. 4, the recommended recordings may be stored in a user partition of the DVR 446 of gateway device 22, a network partition of the DVR 446 of gateway device 22 or both. Recording indicators 1816 may be used to indicate the content is stored in the gateway device 22. The content in the "What's On" portion 1812, as described above, is what is currently broadcasting in the present time slot and is recommended by the recommendation engine. For example, the "What's On" portion 1812 displays "ABC Nightly News", "Sesame Street", "Mythbusters", and "Star Trek: The Next Generation". In the recommended recording portions 1814, "Up All Night", "Louie", "Doctor Who" and "Everybody Loves Raymond" is provided in a sorted content list. It should be noted that the recommended recording portion 1814 may be scrolled using the arrow indicator 1820. A recommendations list may include the "What's On" portion or the recommended recordings, or both.

Figure 19:
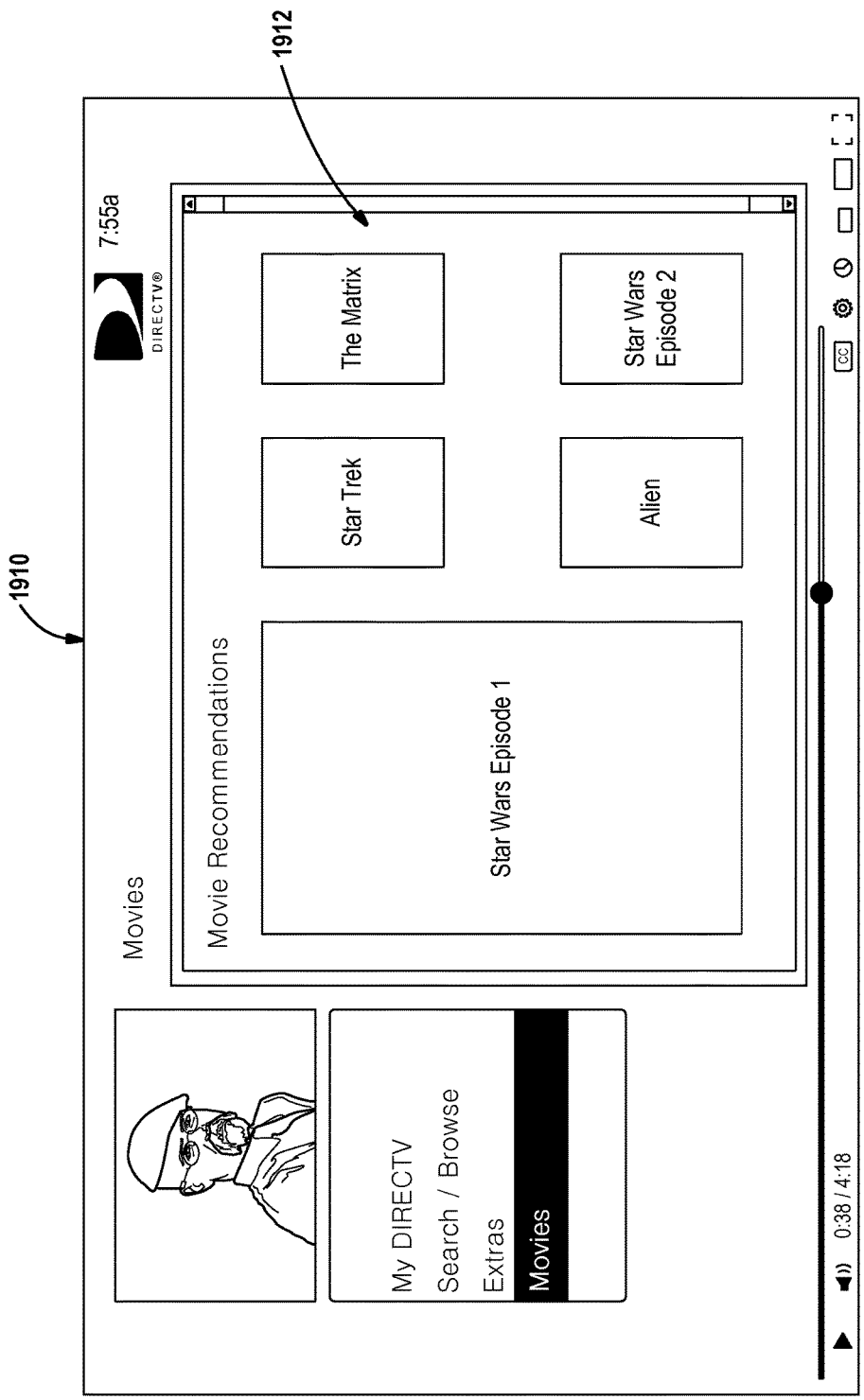
FIG. 19 is a screen display illustrating movie recommendations.

Referring now to FIG. 19, a movie recommendation screen display 1910 is illustrated displaying a recommended movie content list or at least part of a list based on the recommendation engine and the user profile. The recommendation engine may be used for recommending various types of content. "Movies" are only one specific type of content that may be provided. "Movie content" can easily be replaced with "Sports" or "Television Shows" as the specific type. In this example, a movie recommendations list 1912 is illustrated by using posters illustrating recommended movies. The list includes "Star Wars-Episode 1", "Star Trek", "The Matrix", "Alien" and "Star Wars-Episode 2".

Figure 20:
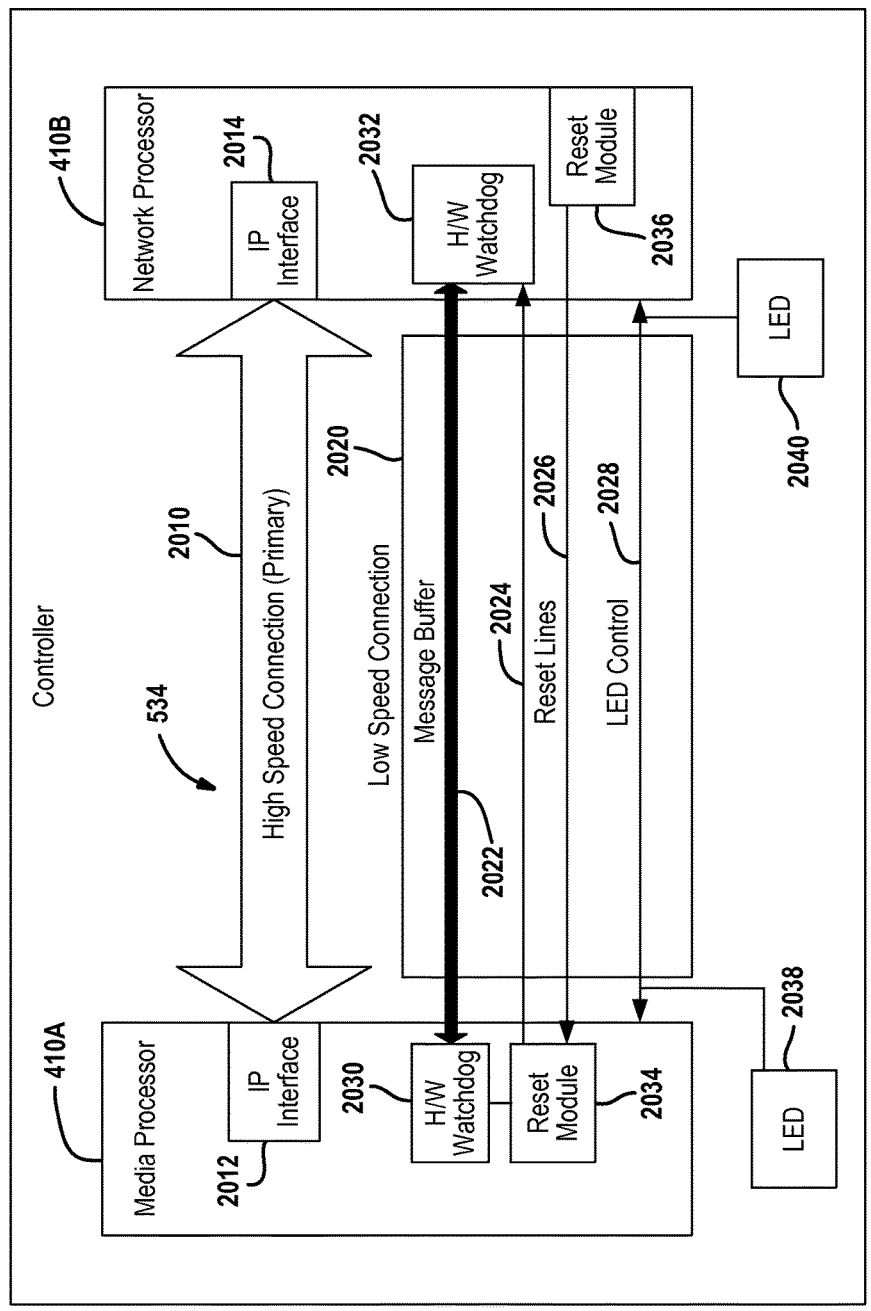
FIG. 20 is a detailed diagrammatic view of the connection bus between a media processor and a network processor.

Referring now to FIG. 20, a detailed block diagrammatic view of the connection bus 534 between the media processor 410A and the network processor 410B is set forth. In this example, a high speed connection 2010 is in communication with an IP interface 2012 of the media processor 410A. An IP interface 2014 of the network processor 410B is also in communication with the high speed connection 2010.

A low speed connection 2020 is also used to connect the media processor and the network processor. The low speed connection 2020 in this example has a message buffer line 2022, a first reset line 2024, a second reset line 2026 and an LED control connection 2028. The message buffer line 2022 may be an RS-232 serial bus that communicates heartbeat messages between the media processor 410A and the network processor 410B. The heartbeat messages are communicated from a hardware watchdog module 2030 of the media processor 410A. Heartbeat messages from the network processor 410B originate from a hardware watchdog module 2032. Heartbeat signals may be communicated from the hardware watchdog module 2030 to the hardware watchdog module 2032 and vice versa. That is, the network processor 410B may monitor the condition of the media processor 410A and the media processor 410A may monitor the operation of the network processor 410B. The message buffer 2022 in this example provides 100 kbps speed therethrough. However, other amounts of data may be communicated therethrough. Boot time messages may be communicated through the message buffer 2022. However, notifications between the processors are the main function. The heartbeat signal communicated through the message buffer 2022 may include, but is not limited to, the CPU load, an interface load data, temperature data for various components, such as the Wi-Fi chip temperature, the hard disk drive temperature, the status of the high speed connection 2010, the amounts of memory being used and other desirable processing data. Ultimately, one watchdog module waits to receive a heartbeat signal from the other watchdog module. The receiving processor enters a state/state machine transition that performs certain heuristics before deciding the other processor is in a non-recoverable state. The one processor that is still operating may trigger a hardware reset through one of the reset lines 2024, 2026.

A reset module 2034 is located within the media processor 410A to generate the reset signal from the media processor to the network processor 410B. A reset module 2036 communicates a reset module to the media processor 410A through the reset line 2026. The LED control connection 2028 may be used to illuminate LEDs 2038 and 2040 associated with the respective media processor 410A and network processor 410B.

Figure 21:
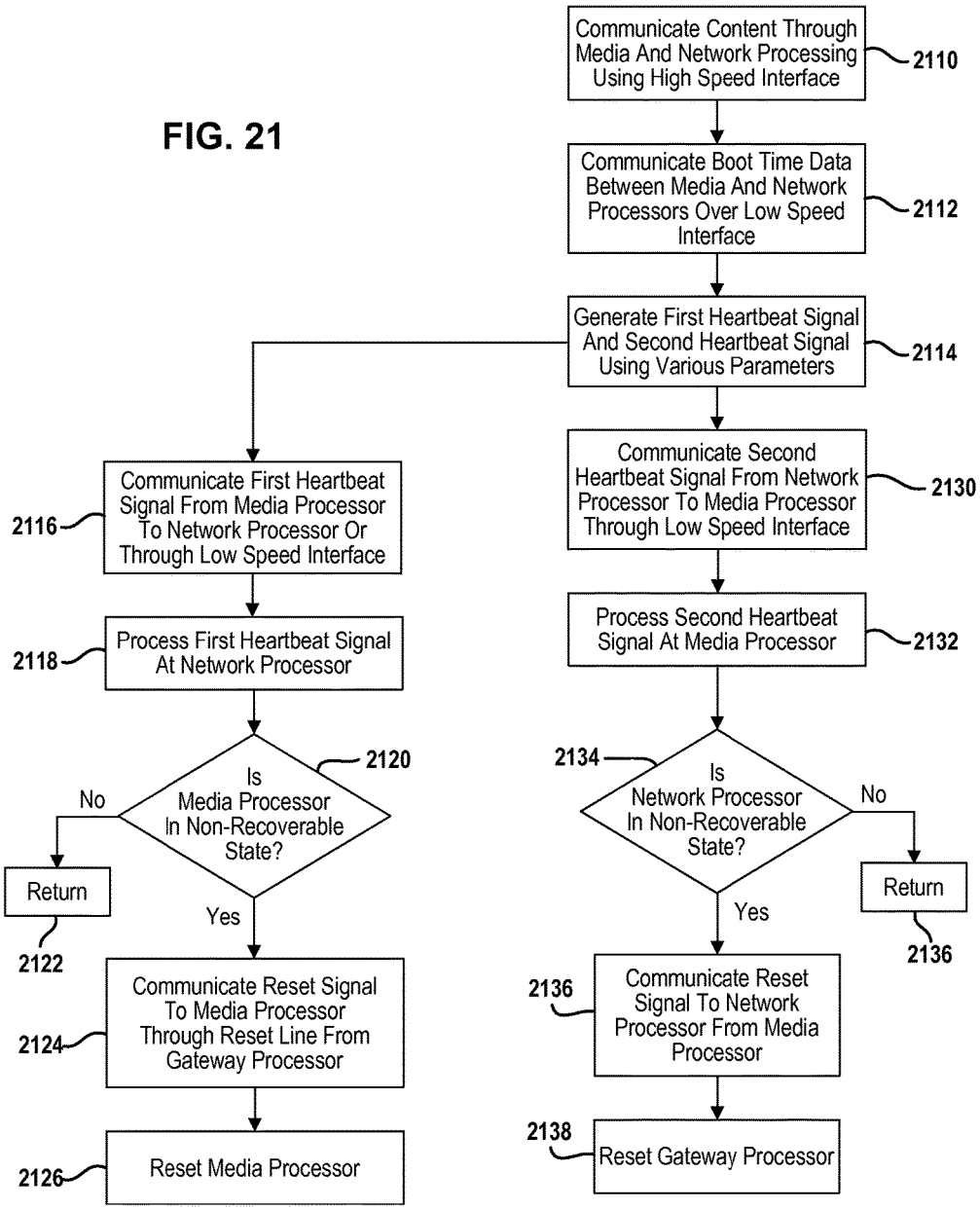
FIG. 21 is a flowchart of a method for resetting one processor from another processor.

Referring now to FIG. 21, a simplified method for operating the low speed connection between the media processor 410A and the network processor 410B is set forth. In step 2110 content is communicated between the network processor 410B and the media processor 410A through the high speed connection 2010 as illustrated in FIG. 20. In step 2112, boot time is communicated between the media processor 410A and the network processor 410B at boot up time in step 2112. This is performed using the low speed connection 2020. In particular, the message buffer 2022 may be used for communicating the boot time data therethrough.

In step 2114 a first heartbeat signal and a second heartbeat signal are generated by the respective media processor 410A and the network processor 410B. The hardware watchdog 2030 generates the first heartbeat signal at the media processor 410A and the hardware watchdog 2032 generates the second heartbeat signal at the network processor 410B. In step 2116 the first heartbeat signal is communicated from the media processor to the network processor through the message buffer interface 2022. In step 2118 the first heartbeat signal is processed at the network processor. The lack of a heartbeat signal may also be processed at the network processor. That is, the network processor may be expecting a heartbeat signal after a predetermined amount of time. In step 2120 it is determined whether the media processor is in a non-recoverable state. If the media processor is not in a non-recoverable state, the system returns to the beginning or to step 2114 in step 2122. When the media processor is in a non-recoverable state in step 2120, a reset signal is generated at the network processor at the reset module 2036 and communicated through the reset line 2026 to the media processor. The reset signal is communicated in step 2124. The media processor 410A is then reset in step 2126.

Referring back to step 2114, after the second heartbeat signal is generated step 2130 communicates the second heartbeat signal from the network processor to the media processor through the message buffer interface 2022. The second heartbeat signal is processed at the media processor. In step 2134 it is determined whether the network processor is in a non-recoverable state. When the network processor is not in a non-recoverable state, the system returns in step 2136. Returning may mean returning to step 2114 or step 2110, depending on the conditions. In a normal monitoring mode step 2114 is repeated.

In step 2134 when the network process is in a non-recoverable state, step 2136 is performed. In step 2136 a reset signal is communicated to the network processor from the media processor. In step 2138 the gateway processor is reset.

By providing a hardware reset, the other processor can control the data and the resetting of the other processor. When one processor fails, the user is not required to repower, restart or reset the entire gateway device 22.

Figure 22:
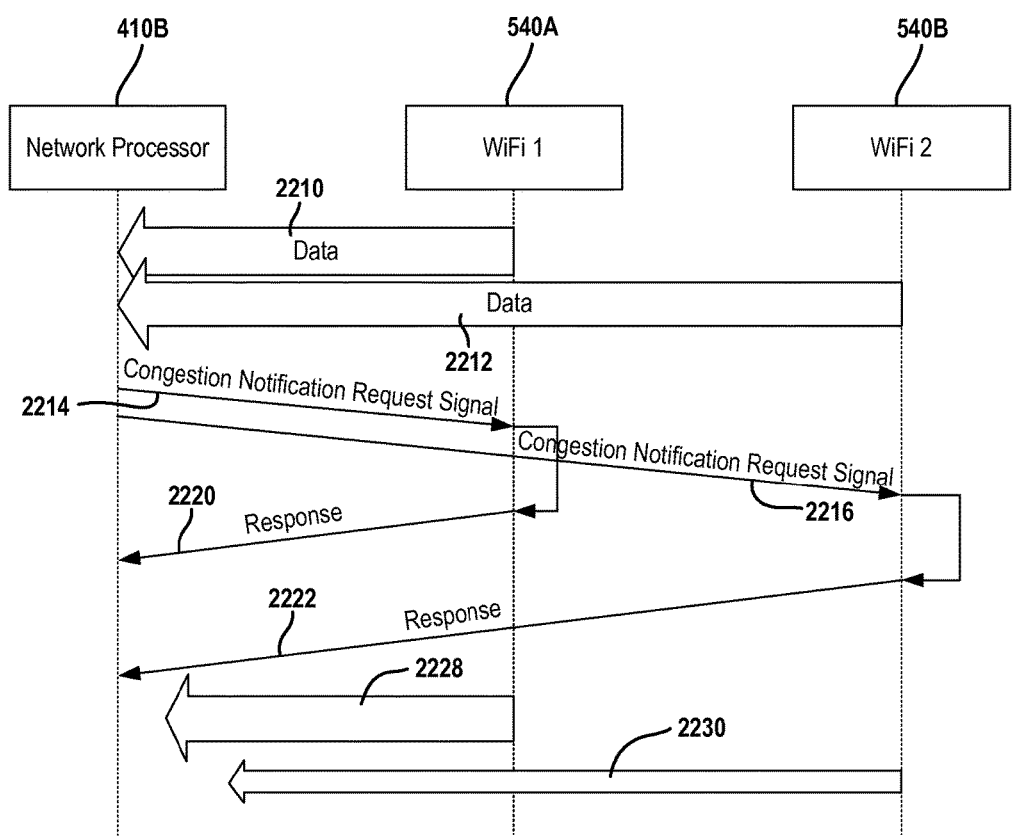
FIG. 22 is a flow of a network processor and Wi-Fi processor.

Referring now to FIG. 22, a method for gateway multi-processor collaboration is set forth for reducing or shaping flows in the gateway device 22. The components in FIG. 5 are also referenced.

The components of interest are the network processor 410B, a first Wi-Fi module 540A and a second Wi-Fi module 540B. The first Wi-Fi module 540 may be referred to as a first communication system or first modem, and the second Wi-Fi module 540B may be referred to as a second communication system or second modem.

The first Wi-Fi module 540A communicates data to the network processor 410B as indicated by the arrow 2210. The data signals may be referred to as first network signals or WAN signals. The second Wi-Fi module 540B communicates data to the network processor 410B as indicated by the arrow 2212. Again, the data signals may be referred to as second network signals. Various types of data may be communicated to the network processor 410B. Some of the data is intended for the wireless area network module 552. Both of the Wi-Fi modules 540A and 540B may be referred to as a system-on-chip. Both of the Wi-Fi modules 540A, 540B attempt to buffer packets when system congestion is detected. In the following example, a process for collaborative notification is set forth in which the network processor notifies the first Wi-Fi module 540A and the second Wi-Fi module 540B so that the conditions may be throttled. Further, a network signal identifier may also be communicated to or from the network processor 410B to the first Wi-Fi module 540A. Individual streams or network signals may be reduced in speed. Thus, certain network signals may be reduced and other network signals not reduced. That is, lower priority network signals may be reduced in speed while high priority network signals may not be reduced in speed. This is referred to as shaping of a stream or streams. Advantageously, this allows the Wi-Fi modules to react to the notification rather than transmitting at a high speed and throttling independently. Performing independent throttling results in a sawtooth effect where the Wi-Fi chips increase speed, then quickly decrease speed, then increase speed. This results in a perceived poor behavior by the users. This behavior is reduced or eliminated.

A second congestion notification request signal 2216 is communicated to the second Wi-Fi module 540B. The first congestion notification signal 2214 and the second congestion notification request signal 2216 are generated in view of each other. That is, the network processor 410B presents an overall strategy to provide improved system performance.

A first response signal 2220 is received by the network processor 410B from the Wi-Fi module 540A. A second response signal 2222 is received at the network processor 410B from the second Wi-Fi module 540B. In response to the congestion notification signals, a first data signal 2228 is not modified, but a second data signal 2230 from the second Wi-Fi module 540B is reduced. This is illustrated by the thickness of the arrow representations of the data signals 2228 and 2230.

By coordinating the individual network signals or streams from different Wi-Fi modules, the network processor 410B can improve the overall performance of the system during heavy load conditions. The network processor 410B can thus improve the performance through the local area network as well as to the wide area network.

Figure 23:
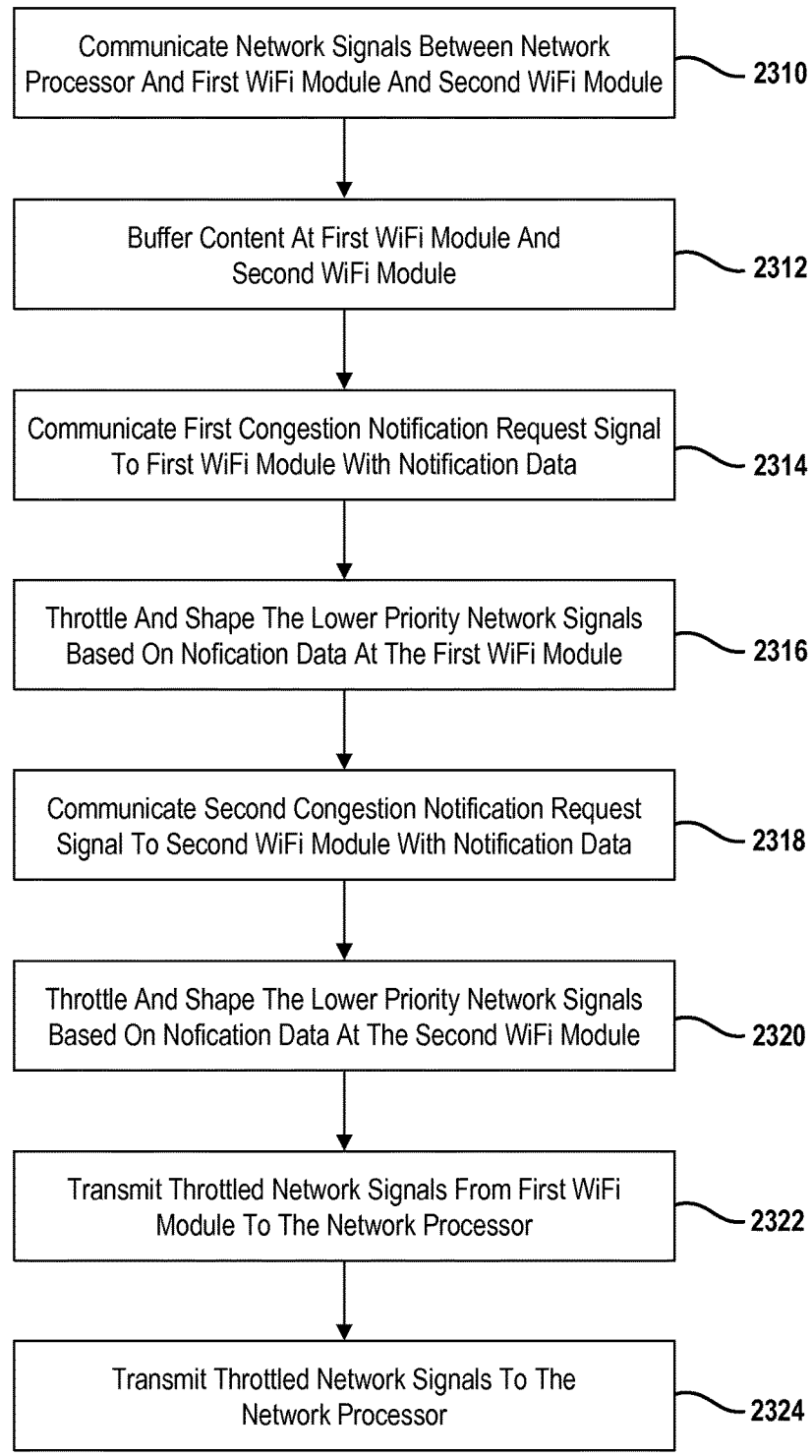
FIG. 23 is a flowchart of a method for prioritizing streams.

Referring now to FIG. 23, a detailed method for operating a network processor 410B and Wi-Fi modules 540A and 540B is set forth. In step 2310 network signals are communicated between the network processor 410B and a first Wi-Fi module and a second Wi-Fi module. Each Wi-Fi module may buffer content in step 2312. That is, each Wi-Fi module may buffer output data that is destined for the network processor 410B. However, as mentioned above, individual buffering may not be advantageous to the overall system performance. Therefore, the present example provides a method for coordinated control of the Wi-Fi systems using the network processor and the quality of service requirements set forth therein.

In step 2314 a first congestion notification request signal is communicated to the first Wi-Fi system with notification data. As mentioned above, the notification data may limit individual network signals or streams of a plurality of streams being received from the first Wi-Fi module. In response to the notification data, step 2316 throttles and shapes lower priority network signals based on the notification data at the first Wi-Fi module. First modified network signals are generated and communicated in response to throttling and shaping.

In step 2318 a second congestion notification request signal is communicated to the second Wi-Fi module with notification data. In step 2320 the second Wi-Fi module has its network signals throttled and shaped based on the notification data.

Throttled and shaped streams are then communicated from the first Wi-Fi module to the network processor 410B in step 2322.

In step 2324 throttled and shaped network signals are transmitted from the second Wi-Fi module to the network processor 410B. Second modified network signals are generated and communicated in response to throttling and shaping.

The process may be repeated as the network processor 410B monitors the overall system streams and the amount of data flowing therethrough.

Figure 24:
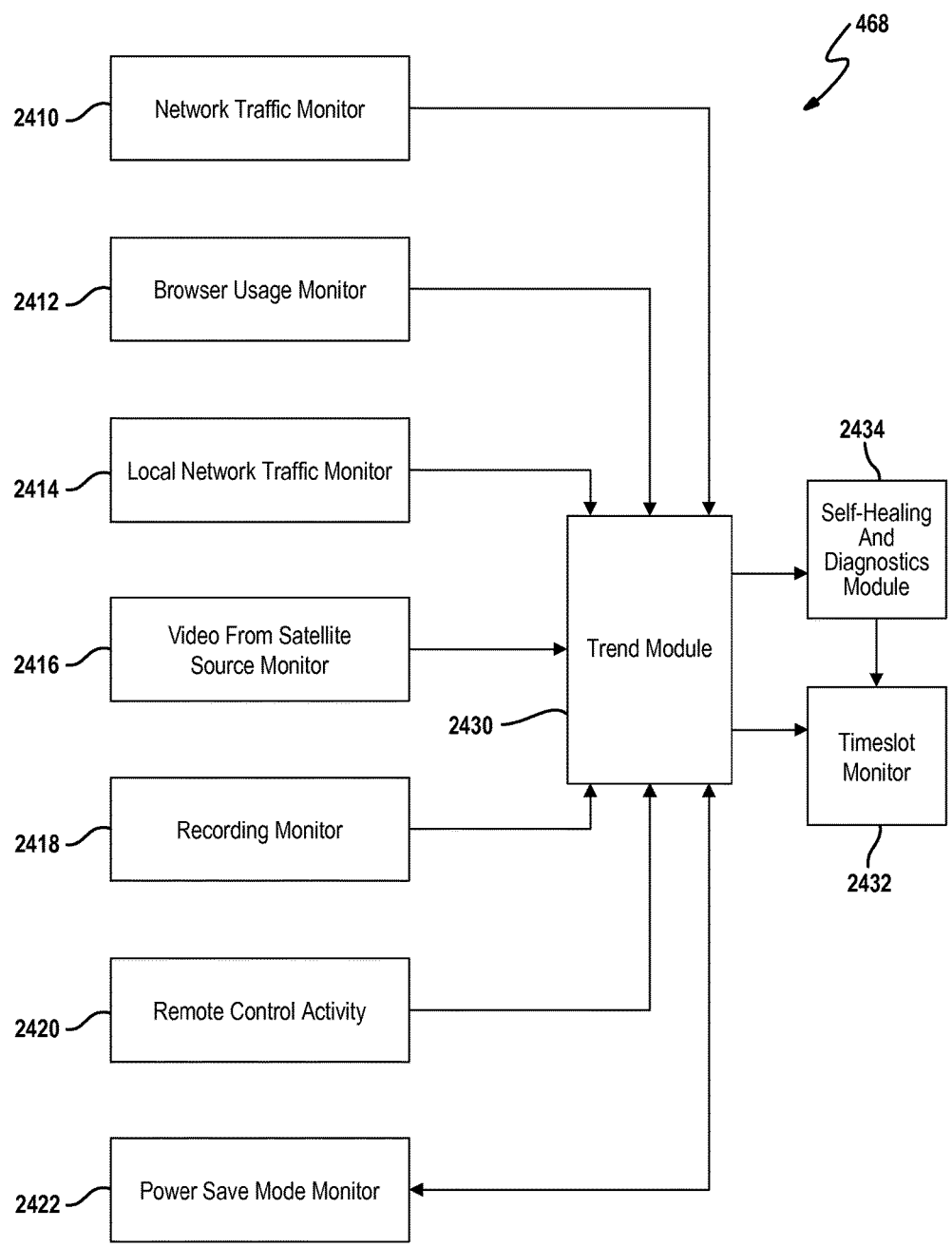
FIG. 24 is a block diagrammatic view of the self-learning module of FIG. 4.

Referring now to FIG. 24, the self-learning module 468 of FIG. 4 is illustrated in further detail. The self-learning module 468 may monitor various parameters of the gateway device 22. A network traffic monitor 2410 monitors network signals, flows or streams through the gateway device 22. The network traffic may include the upstream traffic, the downstream traffic and the wide area network to local area network traffic.

A processor usage monitor 2412 may monitor the amount of processor processing usage being used at a particular time period.

A local network traffic monitor 2414 is used to monitor local IP traffic, including LAN to LAN streams and Wi-Fi streams.

A video from satellite source monitor 2416 monitors the video from the satellite source. The amount of tuners being used and the overall processing of the satellite signals may be monitored. In this example, a satellite signal is used. However, if the system is implemented in another type of system, such as an optical fiber or cable system, the video may be monitored from the cable or optical fiber source.

A recordings monitor 2418 monitors the use of recordings. The recordings monitor 2418 may monitor the saving or storing of content from various sources to a digital video recorder. The recordings monitor may also monitor the playback of content from the digital video recorder.

A remote control activity monitor 2420 may monitor the activity from an input 125 as illustrated in FIGS. 2 and 4. The remote control activity monitor provides an indication whether the system is being used and how much burden is being placed upon the system.

A power save mode monitor 2422 may also be included in the self-learning module 468. The power save mode monitor 2422 monitors the activation of a power save mode of the gateway device 22. The power save mode may correspond to a period of inactive use. The activation of the power save mode is inverse to the amount of data retrieved from the other monitors. That is, when the power save mode is activated, there is little or no use of the gateway device 22.

A trend module 2430 keeps track of various customer behaviors and activity by monitoring the various monitors 2410 through 2422. The trend module 2430 may determine a high water mark, a low water mark and an average water mark for each of the monitor parameters. The trend module 2430 is in communication with a time slot monitor module 2432. The time slot monitor may keep track of the activity within certain time slots. Time slots may correspond to a predetermined time period. For example, a day may be broken down into 24 time periods representing 24 hours. Other time periods may also be used, such as half day or eighths of a day. A self-healing and diagnostics module 2434 is in communication with the trend module 2430 and the time slot monitor module 2432. The self-healing and diagnostics module 2434 is used for self-healing and/or diagnostics by correcting various operational issues within the gateway device 22. Operational issues within the gateway device may include system slowdown due to software code memory leaks, erroneous programming that results in system sluggishness over time, inconsistent state machines, system configuration, coding bugs, etc. that require various action or software resets. Other operational issues include non-terminating processes of the network processor or the media processor. The self-healing and diagnostics module 2434 may also determine a timing of self-healing or diagnostics by monitoring the various times and usage patterns. The times for performing self-healing and diagnostics may change depending upon the usage. Various customers may have different usage patterns and thus the timing for diagnostics and self-healing may vary between customers. Diagnostics may initiate an analysis of the parameters or may result in the communication of parameters to an analytics module.

Figure 25:
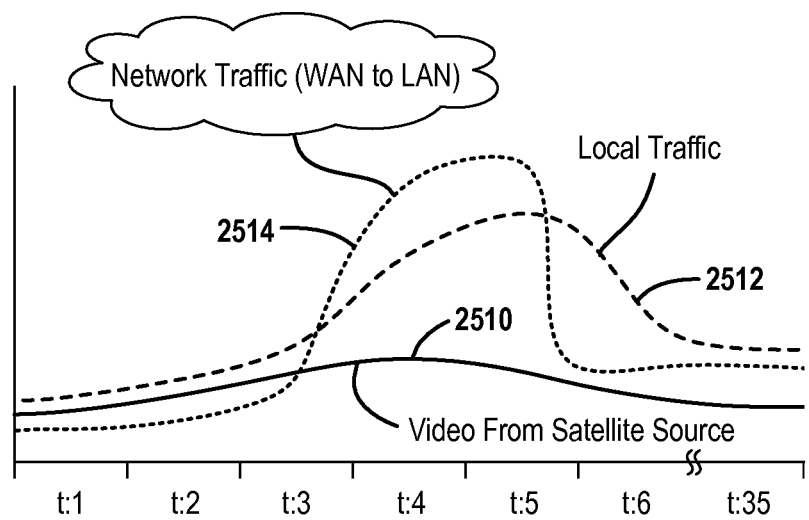
FIG. 25 is a graph of three different parameters being monitored at the gateway device.

Referring now to FIG. 25, the amount of local traffic, network traffic and video from satellite source traffic is illustrated in a plot having 35 time slots. The time slots correspond to a week of time slots. Each day is therefore broken into 5 time slots in this example. As mentioned above, various numbers of time slots may be used depending upon the desired resolution. As can be seen between time periods 3 and 5, most of the activity appears to be performed. This would likely be an inopportune time to perform self-healing.

It should be noted that only three parameters are illustrated in FIG. 25. All or more than the parameters set forth in FIG. 24 may be monitored and plotted. A plot may be provided within the system so that a determination may be made as to when self-healing or diagnostics should be performed.

Figure 26:
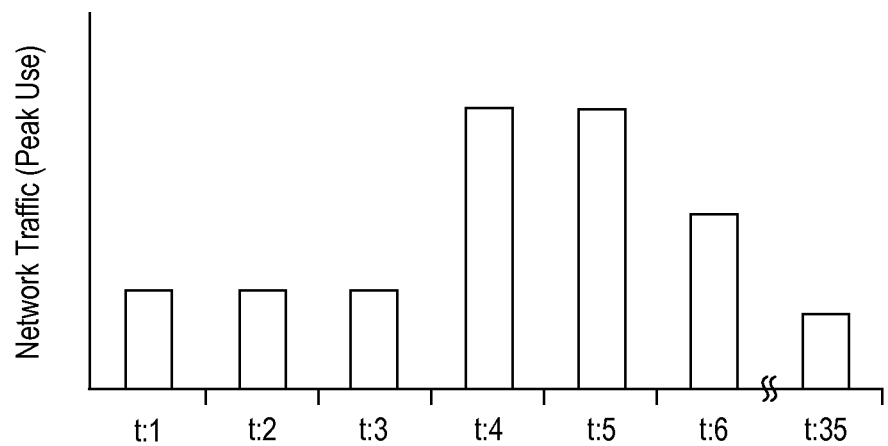
FIG. 26 is a bar graph illustrating a peak use of network traffic.

Referring now to FIG. 26, one of the parameters, such as network traffic is illustrated in a pattern matrix. The network traffic corresponds to the peak use parameters. However, other parameters may also be monitored, such as the low water mark, high water mark or average use. Various time slot graphs for all the parameters and all the averages, low and high water marks, may be determined. By monitoring all the parameters, a customer usage pattern will be evident. This pattern allows a decision to perform self-healing through the self-healing and diagnostics module 2434 of FIG. 24.

Figure 27:
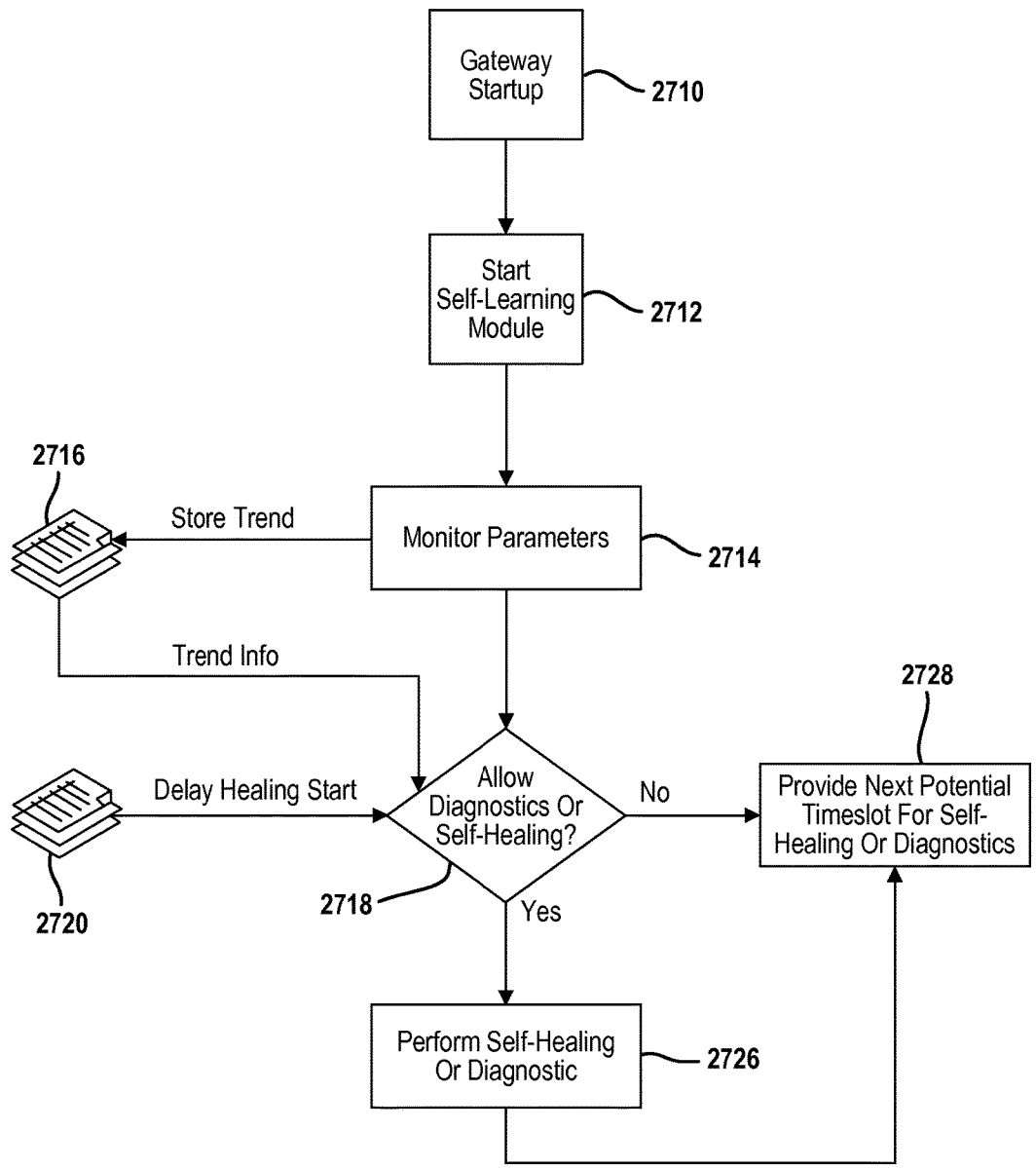
FIG. 27 is a flowchart for a self-learning module.

Referring now to FIG. 27, a method for performing self-healing is set forth. In step 2710 the gateway device is started. The self-learning module 468 is started in step 2712. In step 2714 various parameters, such as those set forth in FIG. 24, are monitored. In step 2716 various trends are monitored and stored by the trend module 2430 and the time slot monitor 2432 of FIG. 24. Both the trend information and the current information from the various parameters set forth in FIG. 24 are provided to step 2718. Step 2718 determines whether or not to allow self-healing. The system may also start diagnostics or self-healing at block 2720. Block 2720 initiates diagnostic self-healing at step 2718. In step 2718 it is determined whether or not to perform diagnostics or self-healing. If diagnostics are performed, step 2726 performs self-healing or diagnostics. After step 2726, step 2728 is performed. Step 2728 may also be performed after step 2718 and a decision not to allow diagnostics or self-healing is performed. In step 2728 a next potential time slot for self-healing or diagnostics is determined. The process set forth in FIGS. 24 through 27 may be performed periodically on a regular basis or on an irregular basis.

Figure 28:
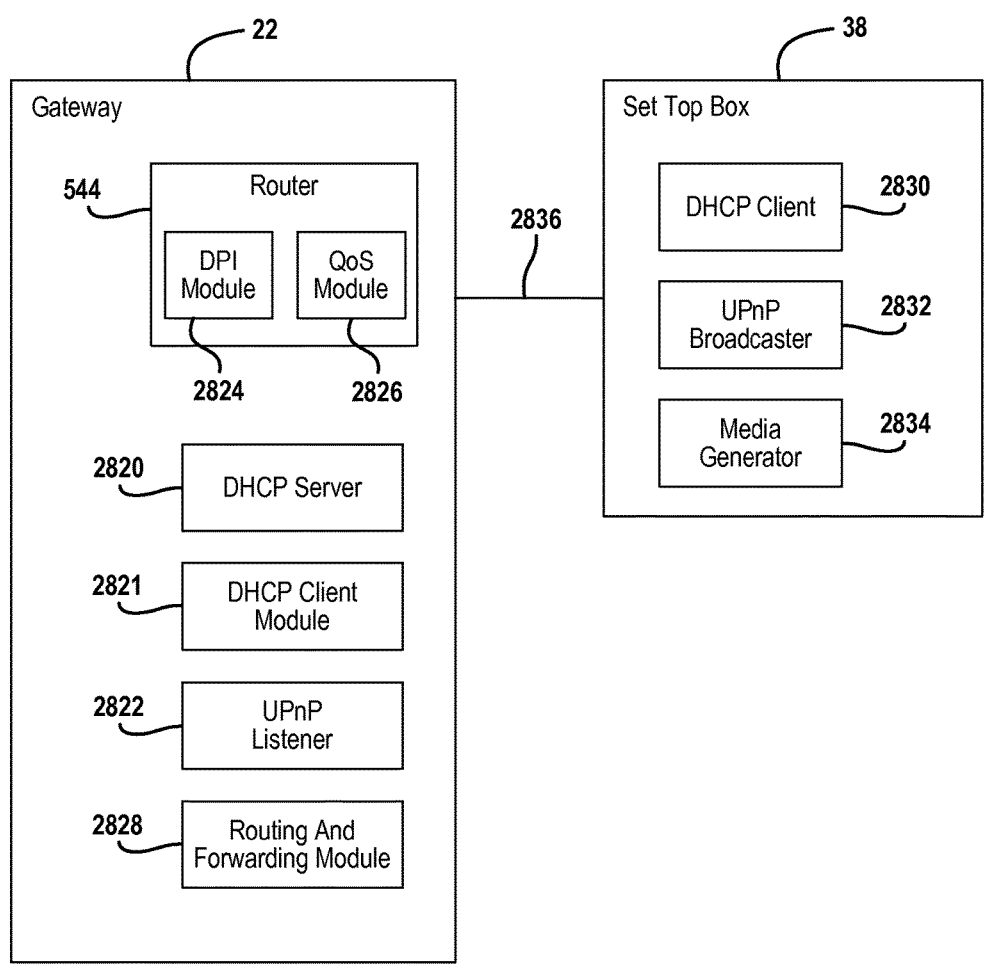
FIG. 28 is a detailed view of the gateway device relative to a set top box.

Referring now to FIG. 28, a method for applying quality of service (QoS) to communication signals in devices not having deep packet inspection capabilities is set forth. The present example applies to one device with deep packet inspection and another device with non-deep packet inspection.

In this example, a gateway device 22 is the deep packet inspection device and the set top box 38, without deep packet inspection, is set forth. However, those skilled in the art will recognize that this applies to various systems outside gateways and set top boxes. The gateway device 22 may include the router 546 illustrated in FIG. 1, a dynamic host configuration protocol (DHCP) server 2820 and a universal plug and play (UPnP) listener 2822.

The DHCP server 2820 serves clients on the local area network side. A DHCP client module 2821 is used to receive IP addresses from the internet service provider on the wide area network side.

The router 546 includes a deep packet inspection module 2824. The deep packet inspection module 2824 may be used to look into communications packets passing through the router 546. Various layers may be inspected, for example, layers 2-7. Useful data may be obtained from the inspected packets, such as a packet flow type, a device identifier corresponding to where the flow is generated or consumed, the bandwidth needed for the flow and characteristics of the flow. Enhanced services and application of quality of service policy to the stream may be performed. The deep packet inspection process may be performed automatically.

The router 546 may also include a quality of service (QoS) module 2826. The QoS module 2826 applies a quality of service policy to the communication signals passing therethrough. Communication signals that are en route to or from the first device (STB) may have the QoS policy applied thereto. The second device, using deep packet inspection, identifies the communication signals en route to the first device and applies the QoS policy because the first device is unable to perform deep packet inspection. For example, a media stream en route to the first device may be identified as a media stream and give a higher priority by applying QoS policy.

The set top box 38 may include a DHCP client 2830, a universal plug and play broadcaster 2832 and a media generator 2834. The exchange of data through a network 2836 is set forth. The set top box 38 is not a deep packet inspection device.

A routing and forward module 2828 may also be included within the gateway 22. The routing and forwarding module may be used to route content based on a routing table to its desired destination. The forwarding aspect of the forwarding module 2828 allows the gateway 22 to forward content not destined for the gateway system. The forward and routing module 2822 thus also forwards content toward its desired destination.

Figure 29:
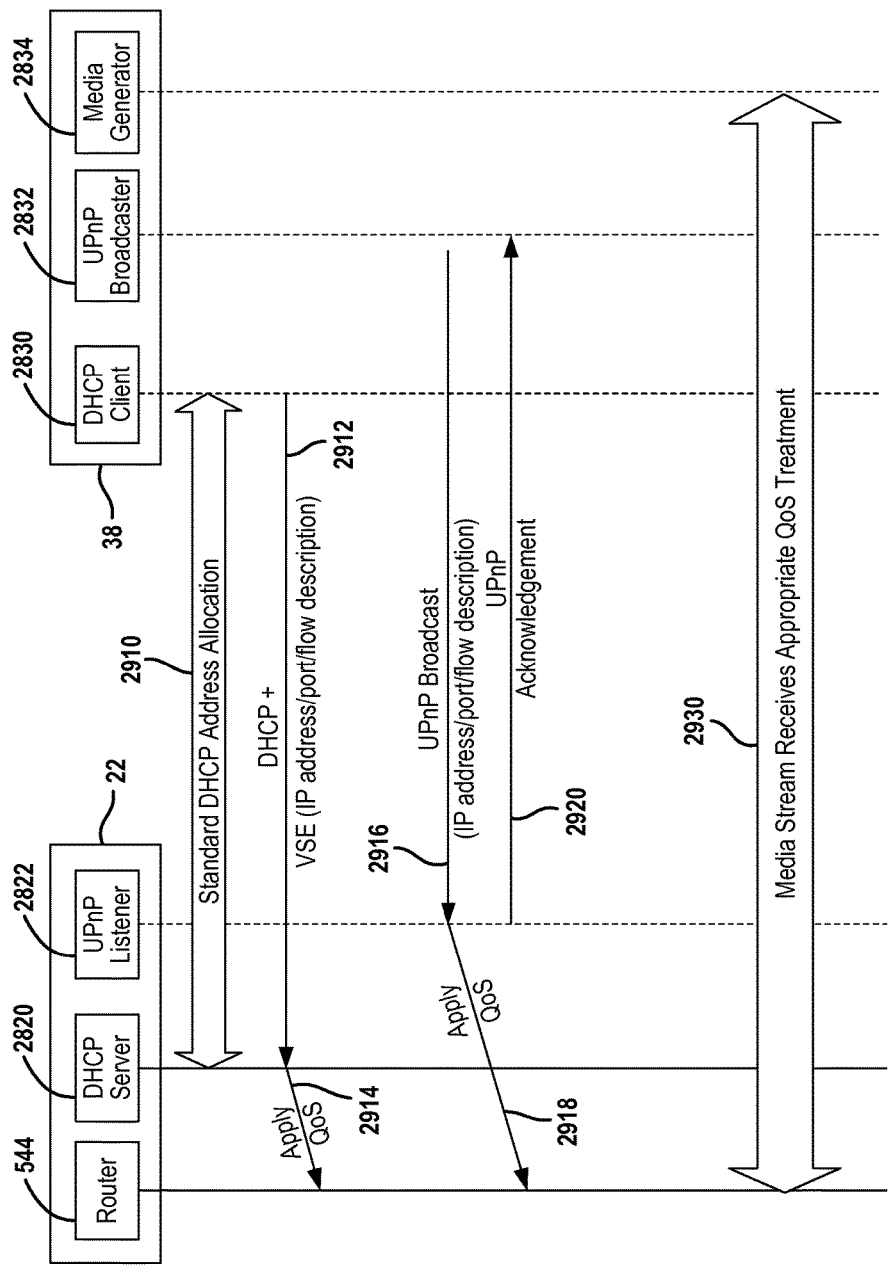
FIG. 29 is a flow identification of the quality of service for a non-deep packet inspection device such as the set top box.

Referring now to FIG. 29, flow identification between a deep packet inspection device and a non-deep packet inspection device is set forth by way of example through the gateway device 22 and the set top box 38 illustrated in FIG. 28. In this example, standard DHCP address allocation takes place in step 2910. The DHCP steps illustrated in FIG. 29 include standard steps including a DHCP discover request signal that is communicated from the client to the server, a DHCP offer signal that is generated in response to the DHCP discover request signal from the service to the DHCP server 2820 to the DHCP client 2830. A DHCP request is communicated from the DHCP client 2830 to the DHCP server 2820. A DHCP acknowledge signal is communicated from the DHCP server 2820 to the DHCP client 2830. In step 2912, a DHCP signal is communicated with a vendor-specific extension (VSE) that encapsulates information about the flow signals between the devices. An IP address and a port identifier describing the flow signal may be communicated in the signal illustrated in FIG. 2912. The DHCP server 2820 applies quality of service rules of the quality of service policy to the DHCP signal with the vendor-specific extension in step 2914. The application of quality of service rules is performed in the router 546. The router is a peer device. The router 546 interprets the DHCP signal with the VSE and maps the flow signals to the quality of service policy. Because all devices are not routers, the two devices perform UPnP broadcasts informing each other about their flows and the description. In step 2916 a UPnP broadcast is communicated from the UPnP broadcaster 2832 to the UPnP listener 2822. The IP address and flow signal descriptions of the consumer or set top box 38 are provided in the data of the UPnP broadcast signal. The UPnP listener 2822 of the gateway device 22 communicates the UPnP broadcast signal with data to the router where quality of service flows are determined in step 2918.

In response to the UPnP broadcast signal received at the UPnP listener 2822, the UPnP listener 2822 communicates a UPnP acknowledgement signal 2920 to the UPnP broadcaster.

After the UPnP acknowledgement in step 2920, the router 546 applies quality of service treatment to signals exchanged between the router and the media generator 2834. The signal 2930 represents a modified media stream by the router whose parameters have been modified so that deep packet inspection may be performed and the quality of service, typically not available at the set top box, is accomplished.

Figure 30:
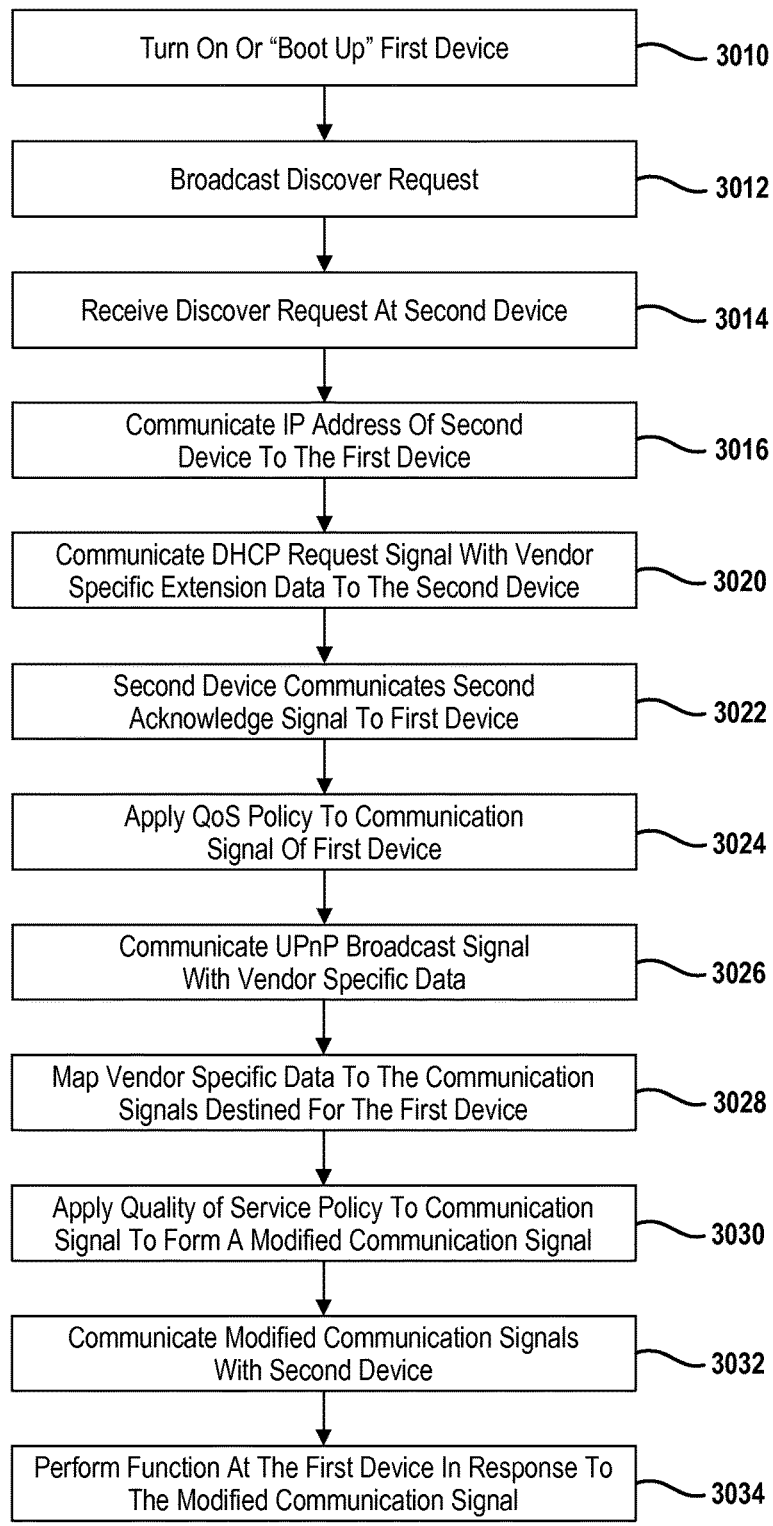
FIG. 30 is a flowchart of a method for applying quality of service (QoS) to a flow signal in a non-deep packet inspection device such as a set top box.

Referring now to FIG. 30, a detailed method for allowing quality of service to be applied to a device not capable of deep packet inspection is set forth. In step 3010, a first device is booted up. In this case, the first device corresponds to the set top box. In step 3012 a broadcast discover request is generated and communicated to the DHCP server of the gateway device. In step 3014, a discover request signal is received at the second or gateway device. In step 3016 and IP address, a port identifier and a flow signal description for the first device is communicated to the second device. That is, the IP address for the second device is communicated to the first gateway device. In step 3020 the first device, such as the set top box, communicates a DHCP request signal with a vendor-specific extension attached thereto to the second device. The vendor specific extension may include an IP address of the first device, a communication port for communicating to the first device and a flow or communication signal description. The second device, such as the gateway device, sends an acknowledge signal to the first device in step 3022. Quality of service policy is applied to the flow signal in the second device or gateway device. That is, the quality of service policy is applied to the communication signal communicated to the first device through the second device in step 3024.

Because all devices are not routers, a UPnP broadcast signal is also broadcasted from the first device to the gateway device (second device). The UPnP broadcast signal has vendor-specific data coupled thereto. The vendor-specific extension data may be the same data as was communicated in step 3020. That is, the UPnP broadcast signal may include an IP address, a port identifier and a flow or communication signal description of the communication signal of the first device in step 3026. The UPnP broadcast signal also informs other devices about the communication signal description due to the broadcast structure of the UPnP signal. Devices that are hosts as well as routers can see the broadcast on the subnet. The UPnP broadcast signal is used to map the data to the communication signals in step 3028. In step 3030 the communication signal is identified. A quality of service policy is applied to the communication signal to form a modified communication signal.

In step 3030 modified communication signals destined for the first device are communicated with the router of the second device with an applied quality of service policy applied thereto. The modified signals are processed with the second device and a function is performed in response to the modified communication signals in step 3034. The function may be displaying the content corresponding to the communication signals or displaying a web page.

Figure 31:
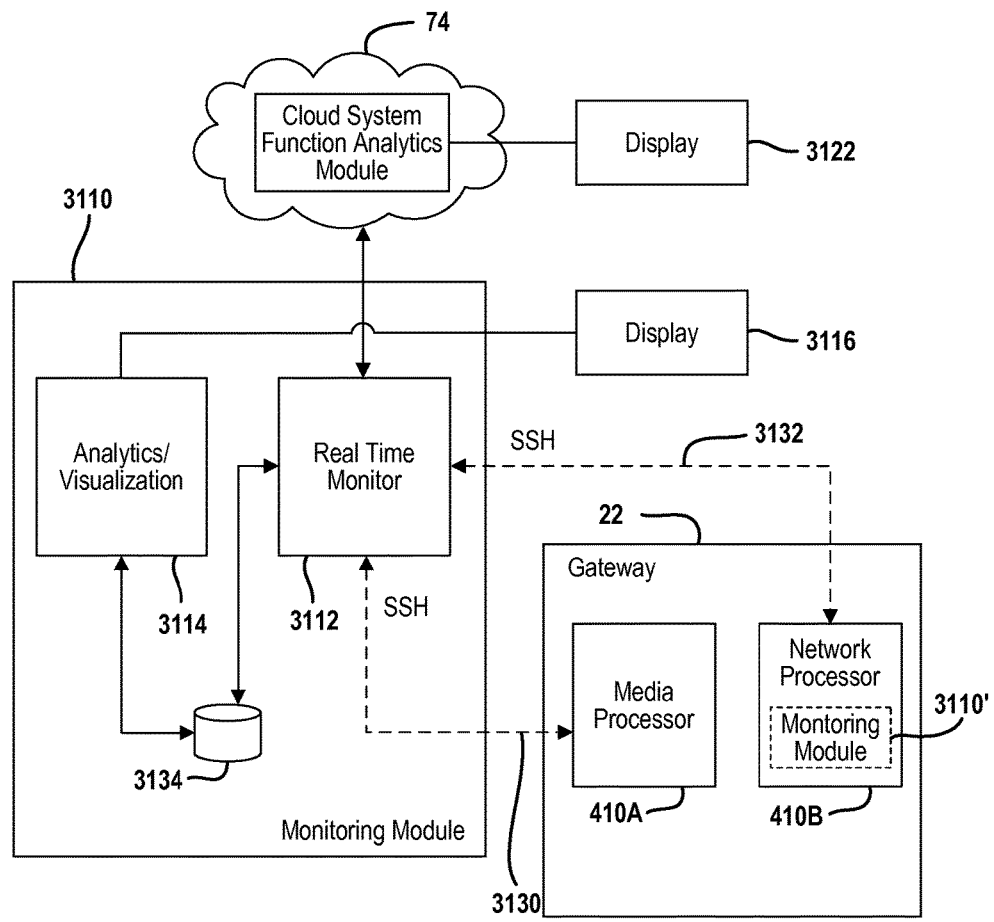
FIG. 31 is a block diagrammatic view of a monitoring module relative to the gateway device.

Referring now to FIG. 31, a simplified view of the gateway device 22 is illustrated with the media processor 410A and the network processor 410B. The gateway device 22 is shown relative to a monitoring module 3110. The monitoring module 3110 is shown as an external monitoring module. However, the monitoring module 3110 may optionally be implemented within the network processor 410B of gateway device 22, as indicated by monitoring module 3110'. The monitoring module 3110 includes a real time monitor 3112 and an analytics/visualization module 3114. The analytics/visualization module 3114 is in communication with a display 3116. The real time monitor 3112 may be in communication with the cloud system function analytics module 74. The cloud analytics module may also have a display 3122.

If the monitoring module 3110 is outside the gateway device, a secure shell (SSH) connection 3130 is used to connect the real time monitor 3112 and the media processor 410A. When the monitoring module 3110 is outside of the gateway device 22, a secure shell connection 3132 is formed between the real time monitor 3112 and the network processor 410B. The real time monitor 3112 extracts low level data and stores it in a database 3134. The analytics and visualization module 3114 is in communication with the database 3134 and provides real time visualization of multiple parameters at the display 3116. By monitoring various parameters, the details of the information and the relation of the data may be visualized. In general, the monitoring module 3110 has low overhead in terms of a memory footprint and processor resource consumption does not result or skew the behavior of the gateway device 22 during monitoring. A number of network interfaces may be monitored, as well as individual flow or network signals within the gateway device 22. The containers and the container process data, and the threads associated with the memory, processor and bandwidth connection may also be monitored.

The secure shell connections 3130 and 3132 create a single session with the multiprocessor imbedded system. The low level interfaces of the gateway device 22 are used to collect targeted data. The monitoring module 3110 may be used to obtain a one-time collection of data or provide a repeated collection of data even down to every few seconds.

It should be noted that the analytics and visualization module 3114 generally provides the data to the display 3116 in real time. Analytics may also be pushed to the cloud system function analytics module 74 or displayed on a display 3122.

Functions monitored by the monitoring module 3110 may include, but are not limited to, the network processor functions, the media processor functions, the Wi-Fi and MoCa® interfacing, the packet processing and DVR communication.

Figure 32:
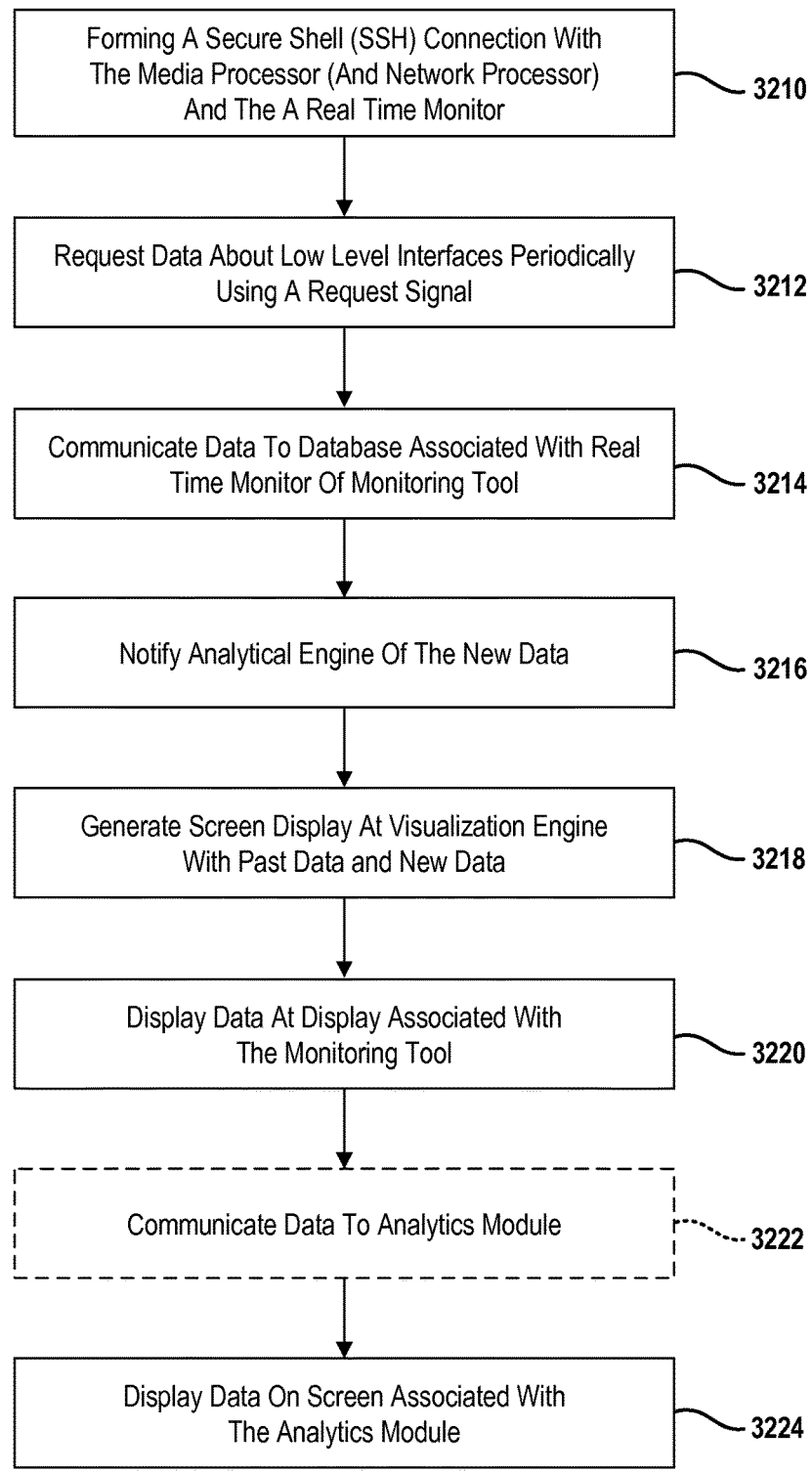
FIG. 32 is a flowchart of a method for obtaining data at the monitoring module.

Referring now to FIG. 32, the operation of the monitoring module 3110 relative to the gateway device 22 is set forth. In step 3210, a secure shell (SSH) connection is formed between the real time monitor and the media processor. An SSH connection may also be formed between the real time monitor and the network processor if the real time monitor is located outside the network processor. In step 3212 data about low level interfaces is requested by the real time monitor using a request signal. In step 3214 data is communicated from the gateway device 22 to the real time monitor and ultimately to the database 3134 of the monitoring module. In step 3216 the analytic/visualization module is notified of the new data within the database 3134. This may be performed with little delay so data may ultimately be displayed in real time.

In step 3218 a screen display generating a visualization engine with past data and new data is displayed. By displaying both past data and new data, trends may be monitored.

In step 3220 data is displayed at a display associated with the monitoring module.

An optional step, step 3222, may be performed in which data is communicated to an external analytics module. The analytics module 74 may be a cloud based analytics module. Another optional step, step 3224, displays data on a screen associated with the analytics module.

Figure 33:
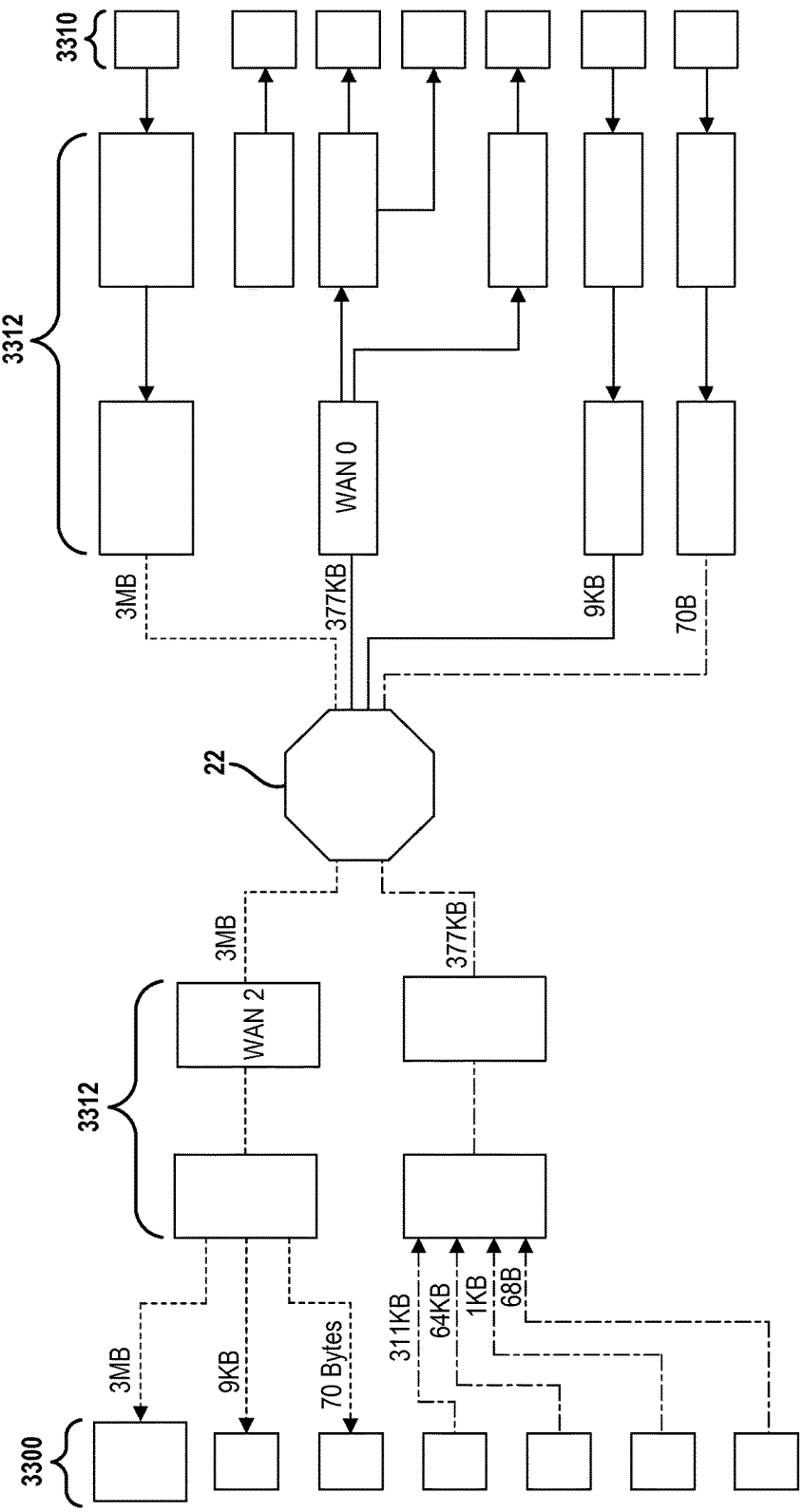
FIG. 33 is a screen display illustrating visualization of hardware accelerated flows through the gateway device.

Referring now to FIG. 33, one example of a system view of the flow signals through the gateway device displayed by the display associated with the monitoring module is set forth. A gateway device 22 is shown with various input and output signals. FIG. 33 represents a screen display illustrated that is used for monitoring the flows. Input/output devices 3310 are illustrated at the left side and right side of FIG. 33. The input/output devices 3310 have flow signals that enter or leave the gateway device 22. The signals enter or leave through interface devices 3312. The interface devices 3312 may include, but are not limited to, the network interface module 540, the LAN module 550 and the WAN module 552 of FIG. 5. The input/output devices 3310 illustrate the external devices to which the gateway device 22 is coupled. For example, various mobile devices and other interface or internet are represented. The interfaces 3312 may be labelled with actual interfaces, such as "LAN2" or may include a MAC address. In an actual example, the lines between the interfaces 3312 and the input/output devices 3310 may be color coded. In this example, the real-time and aggregate bandwidth of the flows through the system are indicated by differently shaped lines. Thus, higher bandwidth flows, such as those illustrated at the top of the document, are distinguished from lower bandwidth flows through the lower part of the figure. The interface devices 3312 may be virtual or physical devices. As described above, the interfaces may include WiFi, Ethernet, software, loopback and other virtual interface constructs.

Figure 34:
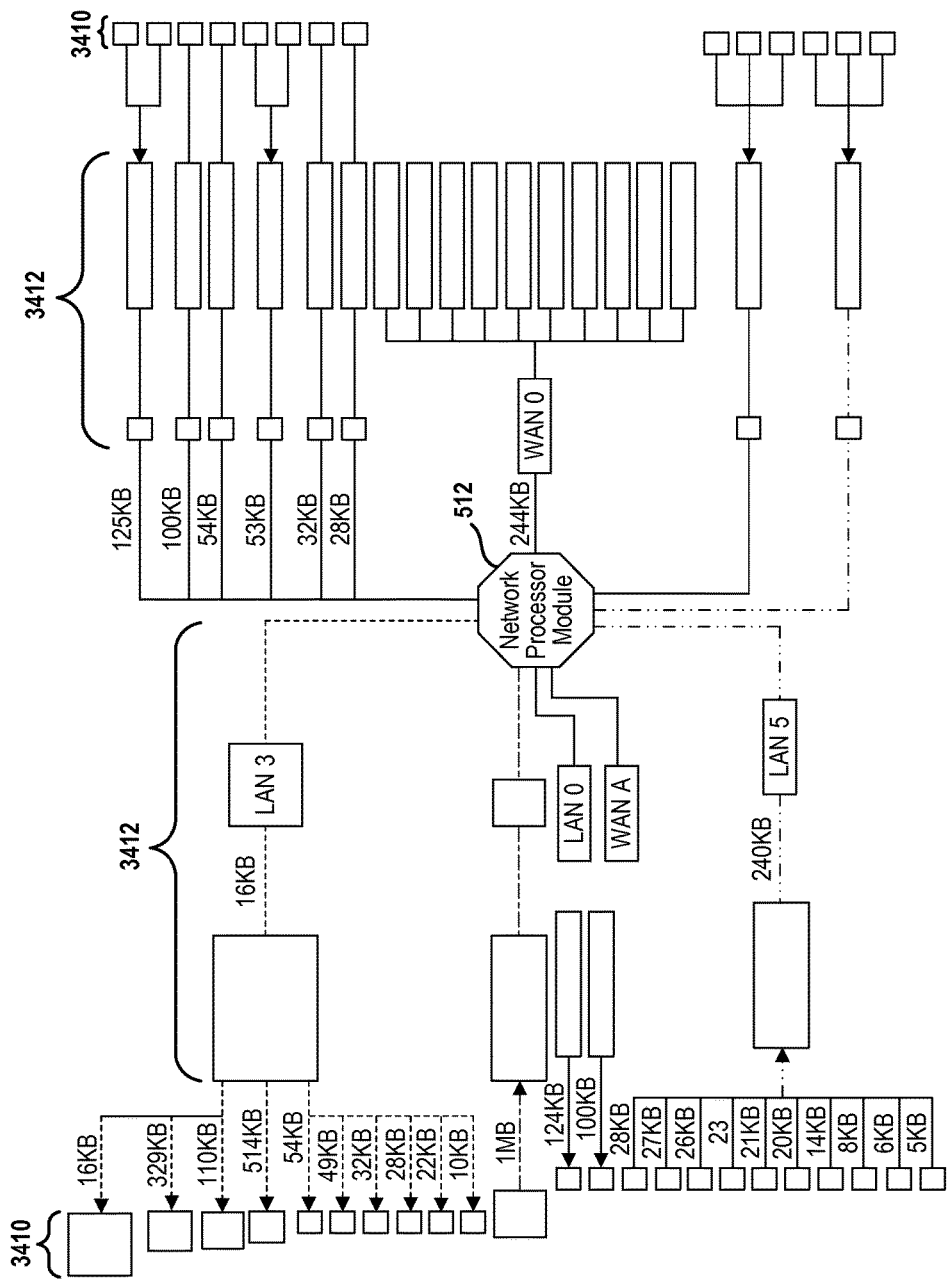
FIG. 34 is a screen display illustrating full views of accelerated and network address translation (NAT) flow through the network processor.

Referring now to FIG. 34, another example of a screen display illustrating system views of accelerated and NAT flows through the network processor is set forth. Various devices and the flow signals associated therewith are monitored. Input/output devices 3410 are illustrated in communication with the network processor module 512. The interface devices 3412 illustrate the interfaces in communication with the network processor module 512, such as the local area network module 550 and wide area network module 552. For example, LAN0, LAN3 and LAN5 are illustrated in some of the boxes. WAN0 is also illustrated. On the screen display, the devices may be selectable so that the actual speeds therethrough may be illustrated, such as those set forth below in FIG. 35. Again, FIG. 35 also illustrates the various interfaces that may include, but are not limited to, WiFi, Ethernet, software, loopback and other virtual interface constructs. The different constructions of the line may correspond to different speeds therethrough.

Figure 35:
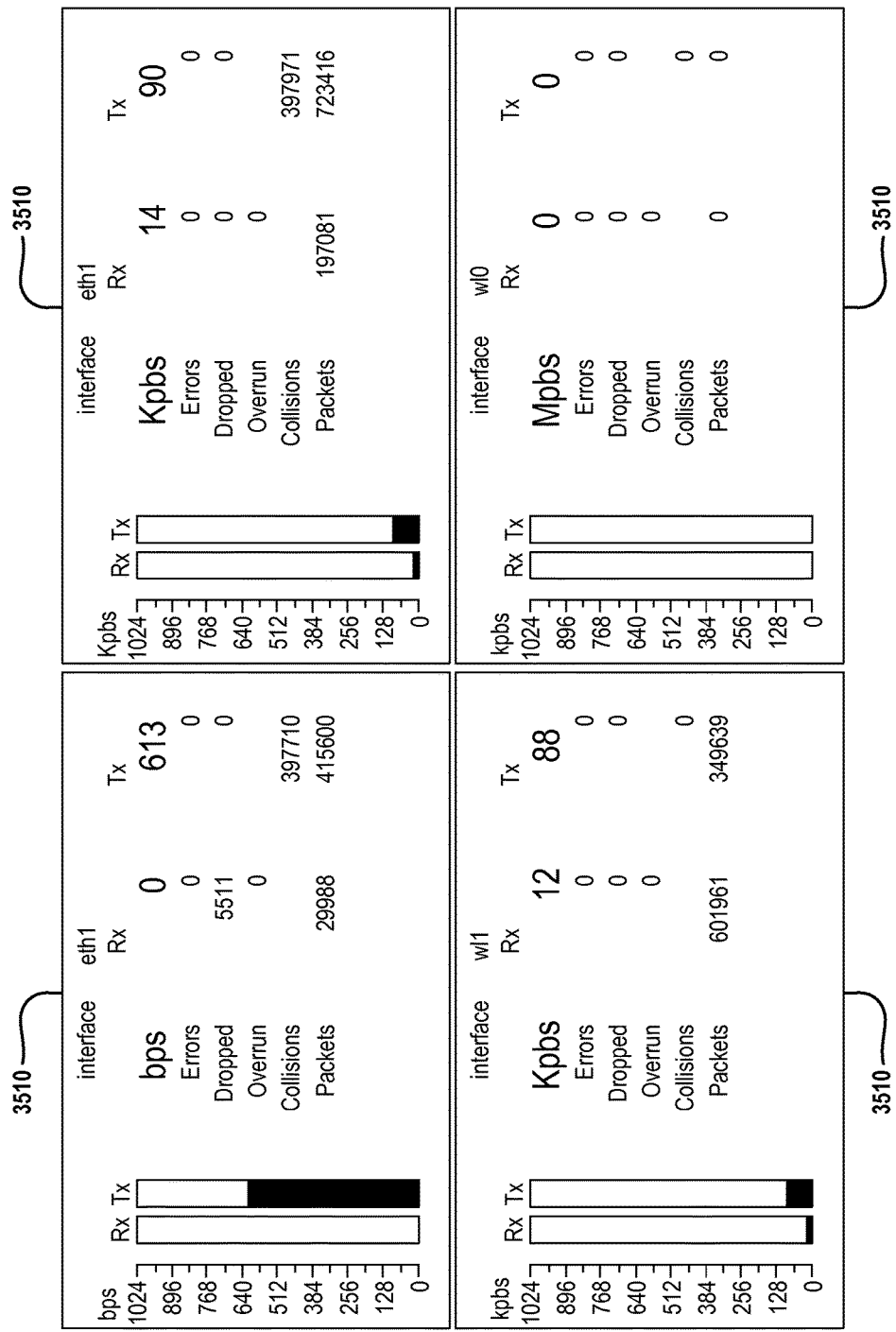
FIG. 35 is a screen display illustrating the receiving and transmitting signals of various devices visible on a user interface from the analytical engine.

Referring now to FIG. 35, a plurality of dials for measuring the bandwidth of various devices visible on a user interface from the analytical engine is set forth. Four speed displays 3510 are illustrated for different interfaces. In this example, eth1, eth2, WL1 and WL0 are displayed. However, speed displays for other interfaces may be set forth. For example, the loopback interface, coaxial interface, a bridge interface, software virtual interface, IPv6 tunnel interface, a chip specific virtual interface, GigE interface, a WiFi interface, a WAN interface and an Ethernet interface may all be displayed with similar data. The speed displays 3510 may be operator selectable, so that different speeds through different interfaces may be displayed. Each of the displays 3510 may include various packet data, including the receive speed (Rx), a transmit (Tx), a bits-per-second receiving and transmitting, errors receiving and transmitting, dropped packets received or transmitted, overruns, collisions and the number of packets through the system.

Figure 36A:
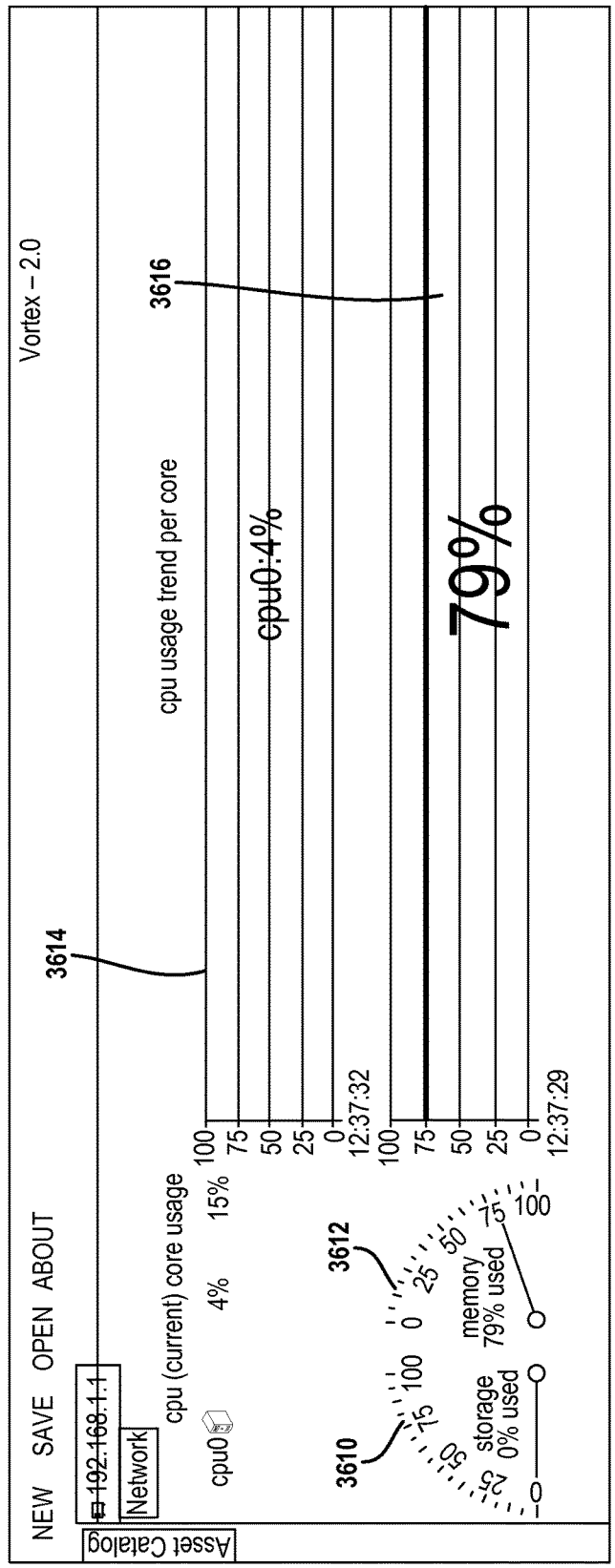
FIGS. 36A and 36B are data representations of trended data from a near-real time database.
Figure 36B:
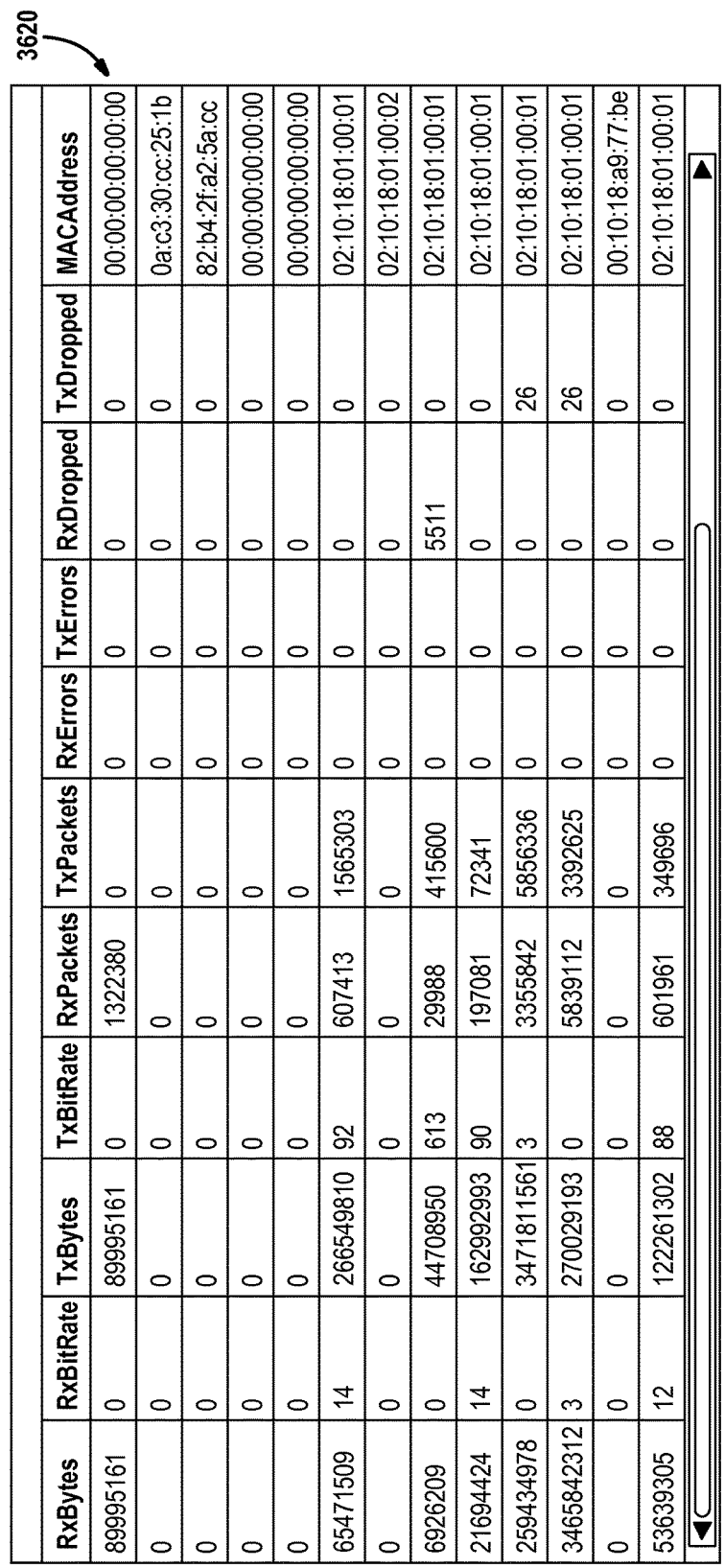

Referring now to FIG. 36A, a screen display illustrating trended data from a near-real time database is set forth. The data illustrated in FIG. 36 corresponds to the CPU usage over time, memory usage over time, disk space used over time, the number of interrupts over time, system load averages over time, packet drops per interface over time, and chip specific accelerator packet stats over time. The MAC addresses set forth correspond to those that exist in the gateway device. A storage percent meter 3610 is illustrated showing the amount of storage used. A memory usage meter 3612 shows the amount of memory used. A CPU usage plot 3614 illustrates the amount of CPU usage (processor consumption) over a particular period of time. A memory usage plot 3616 illustrates an amount of memory used over a selected period of time. In FIG. 36B a current data area 3620 illustrates bandwidth consumption by showing the bytes received, the transmitted bytes, the received bit rate, the transmit bit rate, the received packets, the transmitted packets, the transmitted and received errors, the received dropped packets, the transmitted dropped packets and the MAC address of the monitor devices. Of course, various components may be monitored, such as those described above in paragraphs FIGS. 35 and 35.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of operating a gateway device having a router module, a media processor module and a shared interface module intercommunicating with the router module and the media processor module, said method comprising:

receiving a service request signal at the shared interface module from a gateway application module of the media processor module;

obtaining, at the router module, the service request signal from the shared interface module through an interface handler module of the router module;

communicating the service request signal to a gateway abstraction module of the router module;

communicating a response signal from the gateway abstraction module to the media processor module through the shared interface module; and performing a function at the media processor module in response to the response signal.

2. The method as recited in claim 1 further comprising validating the service request signal at a validation module of the router module.

3. The method as recited in claim 1 further comprising serializing the service request signal at a first serializer/deserializer module to form a serialized request signal.

4. The method as recited in claim 3 further comprising deserializing the serialized request signal at a second serializer/deserializer module of the router module.

5. The method as recited in claim 3 wherein obtaining the service request signal from the shared interface module comprises obtaining the serialized request signal through a communication channel.

6. The method as recited in claim 1 wherein receiving the service request signal at the shared interface module comprises receiving the service request signal at a shared memory shared by the router module and a media processor module.

7. The method as recited in claim 1 further comprising the step of bypassing an IP protocol stack at the gateway device.

8. The method as recited in claim 1 wherein receiving the service request signal comprises receiving an originator identifier.

9. The method as recited in claim 1 wherein receiving the service request signal comprises receiving a timestamp.

10. The method as recited in claim 1 wherein the service request signal comprises a quality of service flow signal.

11. The method as recited in claim 1 wherein the service request signal comprises a session creation or session deletion signal.

12. The method as recited in claim 1 wherein performing the function comprises generating a screen display.

13. A gateway device comprising:

a media processor module comprising a gateway application module;

a router module comprising a gateway abstraction module and an interface handler module; and a shared interface module in communication with the router module and the media processor module, said shared interface module receiving a service request signal from the gateway application module;

said gateway abstraction module obtaining the service request signal from the shared interface module through an interface handler module;

said gateway abstraction module communicating a response signal to the media processor module through the shared interface module; and said media processor module performing a function in response to the response signal.

14. The gateway as recited in claim 13 wherein the router module comprises a validation module validating the service request signal.

15. The gateway as recited in claim 13 wherein the media processor module comprises a first serializer/deserializer module serializing the service request signal to form a serialized request signal.

16. The gateway as recited in claim 15 wherein the router module comprises a second serializer/deserializer module deserializing the serialized request signal.

17. The gateway as recited in claim 15 wherein the router module obtains the service request signal from the shared interface module through a communication channel.

18. The gateway as recited in claim 13 wherein the shared interface module comprises a shared memory shared by the router module and a media processor module.

19. The gateway as recited in claim 13 wherein the service request signal comprises an originator identifier.

20. The gateway as recited in claim 13 wherein the service request signal comprises a timestamp.

21. The gateway as recited in claim 13 wherein the service request signal comprises a quality of service flow signal.

22. The gateway as recited in claim 13 wherein the service request signal comprises a session creation or session deletion signal.

23. The gateway as recited in claim 13 wherein the function comprises a screen display.

* * * * *